United States Patent [19]
Gopinath et al.

[11] Patent Number: 5,925,097
[45] Date of Patent: Jul. 20, 1999

[54] DIRECTLY PROGRAMMABLE DISTRIBUTION ELEMENT

[75] Inventors: Bhaskarpillai Gopinath, Watchung; David Kurshan, Sea Bright; Zoran Miljanic, Highland Park, all of N.J.

[73] Assignees: Network Machines, Inc., Piscataway; Rutgers, The State University of New Jersey, New Brunswick, both of N.J.

[21] Appl. No.: 08/846,177

[22] Filed: Apr. 28, 1997

Related U.S. Application Data

[62] Division of application No. 08/243,578, May 16, 1994, Pat. No. 5,634,004.

[51] Int. Cl.$^6$ .................................................. H04L 12/46
[52] U.S. Cl. ........................ 709/200; 709/202; 709/205; 709/226; 709/238; 709/239; 709/248
[58] Field of Search ........................... 395/200.3, 200.31, 395/200.35, 200.56, 200.68, 200.69, 200.78

[56] References Cited

U.S. PATENT DOCUMENTS

| | | | |
|---|---|---|---|
| 5,355,371 | 10/1994 | Auerbach et al. | 370/60 |
| 5,394,556 | 2/1995 | Oprescu | 395/800 |
| 5,606,669 | 2/1997 | Bertin et al. | 395/200.15 |
| 5,630,184 | 5/1997 | Roper et al. | 395/200.1 |
| 5,754,789 | 5/1998 | Nowatzyk et al. | 395/200.63 |
| 5,784,557 | 7/1998 | Oprescu | 395/200.5 |

*Primary Examiner*—Zarni Maung
*Assistant Examiner*—Saleh Najjar
*Attorney, Agent, or Firm*—John T. Peoples

[57] ABSTRACT

A distribution element composed of a crossbar-type switch with four independent ports and direct multicast transfer capability which effects a direct interface to applications with an instruction sets for the distribution element, the sets providing for global memory sharing, synchronization, and lossless flow control.

5 Claims, 15 Drawing Sheets

SC: SUPER CAPTAIN
C: CAPTAIN
G: GUARD

----- DATA FRAME PROPAGATION PATH
----- VC BLOCKING INSTRUC. PROP. PATH
——— HARDWIRED PORT BLOCKING SIGNALING

FIG. 20
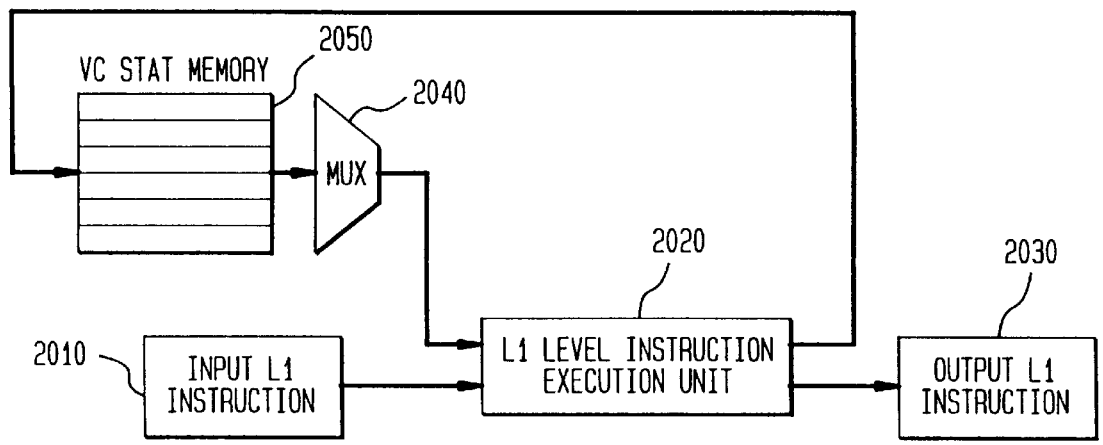
FIG. 21
FIG. 22
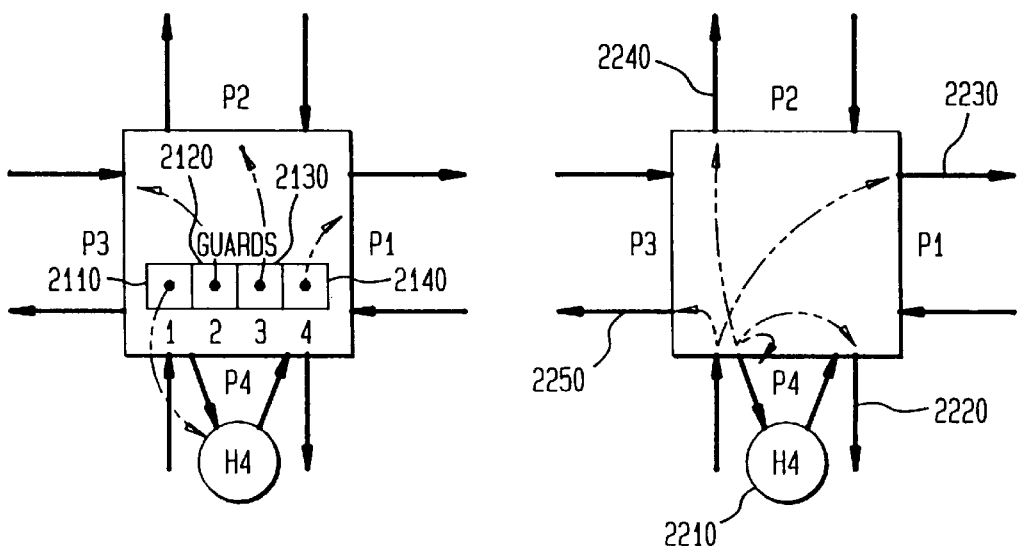

DIRECTLY PROGRAMMABLE DISTRIBUTION ELEMENT

This is a division of application Ser. No. 08/243,578 filed May 16, 1994, now U.S. Pat. No. 5,634,004.

BACKGROUND OF THE DISCLOSURE

1. Field of the Invention

This invention relates to a distributed computing architecture and, more particularly, to a distribution element for configuring the distributed computing architecture wherein the distribution element, through its plurality of independent input/output ports, implements lossless flow control without reservation and direct multicast transfer capability.

2. Description of the Background

The development of computing and communication technology in the last decade has resulted in very high speed individual processors and high speed data transfer media. The emerging new generation of distributed applications, however, still lacks a communication architecture that can efficiently exploit the high performance of data transfer and computing devices. In addition, any new architecture has to support the heterogeneity of communicating agents and satisfy their needs in a transparent way. The architecture should also provide a functional interface to the applications which will significantly reduce distributed software development cost, which is already surpassing the cost of hardware communication installations by at least an order of magnitude.

Currently, data transfer networks lack both performance and functionality. Network installations have transfer speeds of up to 10 Mb/s, and even lower bandwidth because of protocol complexity. This performance is one to two orders lower than requirements of emerging distributed applications. Current networks are based on a message passing paradigm, which is fundamentally different from the distributed program paradigm of shared objects. Current interconnection techniques do not support efficient sharing and coordination, nor do they provide simple integration of heterogeneous applications. The lack of these functionalities is overcome by complex protocols executed by communicating nodes, imposing fundamental performance bottlenecks which cannot be solved within the framework of current architectural alternatives. This problem is exacerbated because the host computers are independent units, usually of different architecture, performance, and even operating systems. Also, the hosts are distributed. Moreover, the interconnection medium between hosts can be of any type and speed.

Unfortunately, the computing power offered by numerous distributed computers is not utilized well. Although many computers in the network can be idle, those users with high computing requirements may be eager for resources that exceed the capabilities of their individual workstations and be unable to use the power of the units attached to the network. This situation obtains because there are no networks that enable sharing of multiple computing resources efficiently and transparently to the application. If a user wants to exploit the power of the units in the network, the user has to create an application that can be scheduled on multiple units for concurrent execution. Such an application would have to perform overhead of parallel execution in order to coordinate synchronization and communication between individual computing tasks. This coordination assumes the user's knowledge of the underlying architecture, which the user usually does not have and does not wish to obtain.

The objective of a distributed system design is to abstract the network so that it appears to the user as a single computer, although it enables use of computing units on the network based on the user's requirements and the availability of units. The multiplicity and distribution of units should be transparent to the user. This network abstraction has to be supported by the architecture of interconnects that comprises the network and by the network operating system.

Current distributed networks are based on devices that were designed specifically to connect two remote units. The networks are thus designed to explicitly enable well-defined communication between point A and point B, where all that point A was asking from the network was to send information to point B. The world of today's distributed applications is very different from this simple communication paradigm. The environment of distributed applications is based on a set of "shared objects", where the objects can be placed at a single site or multiple remote sites. Certain operations on objects performed by one unit can have as side effects communications with the other units in the distributed system. Very often the existence and the location of these units are not even known. The communication patterns between the units can be very diverse: one-to-many, many-to-one, one-to-one among many and so forth. The current networks simply do not provide adequate functions to fulfill requirements of distributed applications. These functions include: a different addressing mechanism that reflects the notion of sharing; reliable and lossless data transfer; direct support for different communication patterns; support for efficient change of communication patterns; and a synchronization mechanism that will efficiently control the sharing of objects.

In order to implement distributed applications on current network installations, the user community is attempting to devise arrangements to overcome this lack of functions by building network operating systems that bridge this gap between the distributed applications requirements and the function of current interconnects. Such arrangements provide applications with necessary functions by abstracting this point-to-point paradigm of the networks into the shared object world seen by applications. The fundamental problem of this approach is that operating system involvement is very inefficient since not only many frequently executed communications and synchronization functions are executed by software, but all that is provided to the network operating system by the interconnects is still just unreliable and lossy point-to-point transfer.

Furthermore, the control of even the simplest point-to-point communication pattern is very complex in current networks. The flow control and routing are resolved by the high level communication protocols, rather than directly by distribution elements. Not only is protocol execution slow because it is performed by software, but it is mostly complex because current control methods allow spreading of the congestion and control information throughout the network and may involve all units in the system. Data losses are unavoidable, and their recovery slow and complex.

Functional requirements of distributed applications cannot be efficiently supported by distribution elements if losses are allowable in the network. For instance, the semantics of shared object update operation is severely corrupted if data is lost on the way to one of the units but not on the way to the others. In order to preserve semantics of such operation in the lossy environment, the problem of canceling the effect of the operation or acknowledgments between all the units that share the object before the operation takes effect must be handled.

The applications that require high communication network bandwidth belong to two classes. The first class relates to applications that involve exchange of large amounts of data between geographically dispersed agents that can produce and/or consume data at the rate of hundreds of Mb/s. The computing and data acquisition and display devices that operate at this data rate became very common, as is best illustrated by the fact that high performance supercomputers, workstations and peripherals are coming out with a HIPPI 800 Mb/s interface. The other class of applications are computationally-intensive applications that were traditionally executed on very expensive parallel supercomputers, whose computational requirements can now be satisfied with a large number of powerful workstations, which are available in many organizations, provided that they are interconnected with high bandwidth networks.

The recent advancement in the optical amplifiers technology has made the design of Gb/s fiber links feasible at reasonable cost. The improvement in the semiconductor technology, where sub-nanosecond gate delays are already reality, has made possible commercial designs of the very fast transmitters and receivers with parallel-to-serial converters (and vice versa) that support rates of up to 1 Gb/s. The transfer rates across point-to-point links are much higher than the rates across busses realized with the same transmission medium, due to the simpler access protocol and the electrical interfaces.

The speed of the high performance network hosts has also dramatically improved over the last years. High performance supercomputers capable of performing 1 billion operations per second are already a reality. The supercomputers is that produced 10 to 50 MFLOPS required approximately 10 Mb/s I/O bandwidth, so that it is expected that the contemporary supercomputers will request a Gb/s rate of I/O bandwidth.

With a high speed transmission links and hosts capable of pumping them at the Gb/s data rate, the speed at which communication protocols are executed in order to minimize packet loss and buffer overflow becomes a bottleneck of high speed distributed computing systems.

As already alluded to, current networks are based on an I/O network abstraction. Every object transferred through the network requires an explicit I/O request by the application. Since I/O operations are protected operations not directly accessible to the application programs, application I/O requests are translated into the operating system calls. The operating system and the network communication control programs are responsible for bridging the gap between the application, which is essentially based on memory abstraction, and network communication, which is based on I/O abstraction. The transformation between the two abstractions is performed by complicated multilayered protocols that require substantial amount of processing and copying of data. The protocol overhead is the reason why interprocess communication over the network has achieved a small portion of the network bandwidth, even if the fastest processors are used for today's relatively slow (10 Mb/s) networks. As indicated above, the new data transmission technology offers two orders of magnitude larger transmission rates (~Gb/s), whereas processing speed did not improve by more then a factor of 10. Thus, it can be expected that protocol overhead will be even larger bottleneck in the faster networks.

Why does the difference in memory abstraction of application and I/O abstraction of the network communication require such extensive amount of processing and memory accesses? First, the necessity of operating system involvement in I/O transfer is time consuming due to context switching and data copy. Second, memory abstraction views data as persistent and consistent global name space. On the contrary, I/O abstraction of current networks has inherent notion of loss, thus maintaining applications requirement for persistence through the complex and time consuming loss detection and recovery mechanisms. Furthermore, addressing is based on physical locations of destinations, and an application's view of global name space is maintained through numerous translations of global names into the physical network addresses. There is no provision for consistency by network protocols, and its support is left to the application or operating system.

The loss in the current networks occurs for the following reason. Bandwidth for the required data transfer is not reserved on the whole path between source and destination, since it would be time consuming, and would result in a large waste of communication bandwidth. Data is rather partitioned into individual packets, and each packet routed separately based on the physical address of the destination and the assumption of the bandwidth availability of the links between neighboring nodes in the network. Since there is no explicit information of bandwidth availability, but only assumption based on statistical reasoning, losses due to data congestion are unavoidable.

Thus, in order to simplify the interface to application and protocol complexity, the architecture of communication devices should be based on memory abstraction. For that purpose, the architecture and its implementing device should provide means for lossless communication, routing based on the global name space and mechanisms for maintaining consistency of global name space.

The network control functions have not been provided for effectively in the prior art and, accordingly, must be addressed by any newly devised architecture and concomitant implementing element are now discussed in further detail.

NETWORK CONTROL FUNCTIONS

From the previous discussion, it is apparent that the main obstacle to the overall performance of the current networks is loss of data due to the traffic congestion. Furthermore, the cost of loss detection and re-transmission will be higher in a network with higher bandwidth, since latency on the large links is larger then the time needed to insert the data into the link. The problem of protocol complexity is even more severe since it cannot be expected that the processing speed will be improved at the same rate as the data transfer speed.

In order to avoid loss, data flow control has to be implemented on the basis of deterministic bandwidth information. The statistical bandwidth knowledge cannot guarantee no loss. Furthermore, due to the burstiness of data traffic in a gigabit network, statistical bandwidth information cannot be of much use even for reduction of losses. The design of networks with much higher bandwidth capacity than are the current application requirements also will not work since there are many applications that can efficiently use the full bandwidth of fastest transmission media. On the other hand, end-to-end communication for bandwidth reservation is out of question because of a large latency of long links relative to the transfer rates.

A completely new data flow control approach is needed that will eliminate loss without excessive performance penalties in fast transmission medium environment. The data flow control must be simple in order to be processed fast, and locally autonomous in order to avoid latencies in large networks.

The routing through the fast interconnection networks should be based also on memory abstraction of the network. Implementing the network as a shared global memory space hides network structure and the network itself from the application in the same manner as virtual memory hides hierarchical secondary storage. The sharing of data in the memory abstraction networks is implicit, i.e., a side effect of computation, rather than explicit I/O as in the current networks. The biggest disadvantage of the current physical addressing mechanisms in the networks is that the whole path between the source and destination has to be known in order to establish connection. This is particularly disadvantageous in a multicast communication through the self-routing network, where transfer objects have to contain addressing information for each particular destination. A second disadvantage of physical addressing is that it is not flexible with respect to the mobility of communicating objects: if one object moves in the network, all other objects in the whole network that communicate to it have to be informed about its new physical address.

In the shared global name space based routing, one global name refers to the same object throughout the network, although multiple physical copies of that object exist in the network. Any update of the local copy of the shared object is mapped to the network, and sensed by all communicating nodes that are interested in its value at a certain instance of time. The shared global name space based-routing is locally autonomous, in the sense that the routing information at each network node should be concerned only with the neighboring nodes. It is robust with respect to mobility, since movement of the object from one node to another requires updating of routing information only at the neighborhood of the outgoing and incoming node.

The biggest problem with the implementation of global name space is keeping multiple copies of data consistent throughout the network, known as the memory coherence problem. The goal is to provide all agents that share the object with the ability to sense any update of that object in the network in a controlled manner. In other words, every application should have ability to read the latest written copy of the object if and when it wishes so, no matter where in the network the object is updated last. The memory coherence mechanisms for non-bus based distributed mechanisms are directory based and it is known that its efficient implementation across the networks requires direct support for multicasting.

The sharing of objects requires the means for synchronization of access. If the updates of shared object are not controlled, the value of the object would depend on the order of updates by individual units. In other words, the semantics of application would depend on the relative speed of the execution units. Through the synchronization mechanism, the updates can be controlled so that only one write is allowed in the period of time, or multiple write operations are mediated before taking effect. The realization of multiple writers schemes requires two phase synchronization protocol, where in the first phase all updated values are propagated, and in the second phase, the update takes effect after mediation of individual updates.

If degree of sharing is large and operations to shared objects are frequent, the synchronization operations are executed very often. If synchronization mechanisms in a distributed environment are strictly memory based, the synchronization accesses would easily saturate the network. A simple example of a memory-based synchronization primitive is a test-and-set instruction, which atomically tests and eventually changes the memory based flag. If the value of a flag denotes the free state, it is set to the value that denotes the busy state, and control of a shared object is taken. If the processes that share that object are placed on different processors, each processor has to access the flag and find it free before it can take control of a shared object. In a highly contentious situation, the processors may constantly try to access the flag, and synchronization-related data transfers may take a lot of the interconnection network bandwidth.

Thus, the interconnection device itself should provide the means for synchronization that will reduce synchronization related network traffic. The synchronization mechanism must be distributed and fair in order to achieve good performance and reliability. If the synchronization mechanism is centralized, the centralization point can become a bottleneck and network path towards it can easily become congested. The distribution on the other hand imposes the problem of coordination between the agents, which in turn has to be self-synchronized.

Synchronization is also very important for the control of coherence mechanisms in order to improve their performance and reduce unnecessary accesses to the network. Rather than distributing all updates of the shared objects across the network, the write and read operations can be controlled with respect to the synchronization mechanism so that the data is read only when desired and when there is a new update.

The function of the host interface is to transfer data between the network and the host memory accessible to the application. The host interface has been a traditional bottleneck of the networks and since the processing speed of the host interface has not improved as much as the speed of transfer media has improved, it can be expected that the host interface problem will be even more important in emerging gigabit networks. The reasons for the current performance bottleneck in the host interface are processing of complex protocols needed to bridge the gap between memory abstraction of the application and strictly I/O abstraction of the network, and the large number of memory accesses performed during the copy of data between different formats used by the applications and the communication protocol.

There are two parts of the host interface: the network interface and the interface between the network interface and main memory of the host. The first part is an essentially solved problem since there are already fast interfaces (HIPPI operating at 800 Mb/s) which can interface directly to the gigabit network, and memory that can receive data at that rate. The mapping of data received from the network into the application data and vice versa is still an unsolved problem. The reason is that there is a different format of data used by the application and the network protocol due to essentially different abstractions. The key to this solution is consistent design of the network as the memory abstraction that will avoid operating system involvement in communication and simplify enough of the communication protocol so that most frequent data modifications between interface buffer and a host's main memory can be assisted with the special purpose hardware. The avoidance of the operating system would reduce context switching and interrupts, and direct hardware modifications of data would reduce the number of host's accesses to the memory, cache invalidation and flushing.

DISTRIBUTION COMPONENTS

Distribution components are interconnection devices used for creation of communication networks. The main classes of distribution components are busses, links and switches. Their characteristics, as well as the benefits and problems of using them as building blocks of interconnection networks, are now discussed to provide a context for the inventive aspects of the present invention.

1.) Bus

A bus is the distribution component shared by multiple modules. A bus is typically used as the interconnection medium for multiprocessor systems, where modules of the system are physically close to each other. Only one module at a time can be the transmitter on the bus, but multiple modules can be receivers. The transmitter is the bus master module, and receivers are slave modules. Modules interconnected by the bus can have master, slave, or master-slave architecture, if they can act as the transmitter on the bus only, receiver on the bus only, or both respectively.

In single-master bus systems, only one module has master architecture. This simple bus architecture is used for single CPU expandable systems, where additional functional modules can be attached to the bus. Large mainframe computers use the single-master bus for interconnecting modules. Examples of a single-master bus are IBM PC XT and AT buses. In multi-master bus systems, multiple modules have master or master-slave architecture. The bus mastership arbitration protocol has to be supported by the bus in order to resolve eventual conflicting requests for the bus mastership. Example bus architectures of the multimaster type are MULTIBUS I, MULTIBUS II, and VME bus standards.

The two communication schemes implemented by bus interconnects are shared-memory and message passing. The shared-memory scheme is simpler to implement, but data transfer speed is limited to the speed of memory. On the other hand, the message-passing scheme is faster since it is de-coupled from direct memory access and every data item does not require a corresponding address as in the shared-memory scheme. However, the implementation of the message passing scheme, especially the bus interface logic of the modules, is complex.

In a shared-memory system the bus master writes into the shared-memory and the slave modules read from it. Shared-memory can be centralized or distributed. There is one shared-memory module accessible to all processors across the bus. In order to write into the shared-memory or read from it, the processor must acquire bus mastership. Thus, only one processor at a time can access shared memory, and other processors must wait even though they may require different shared data items. There is only one copy of shared data.

In a distributed shared-memory scheme there is a cache memory buffer associated with each processor. Each cache memory can be accessed both from the system busses and from its processor. The shared data is replicated in the cache memories of all processors that share it. Any write to the shared data is passed to the system bus, and affects all copies. Contrary to the centralized shared-memory scheme, the read of shared data items does not require access to the system bus, only access to its own cache copy.

A centralized scheme is easier to implement, but its performance can be poor if the degree of data sharing is high, since both the bus and shared-memory can easily become performance bottlenecks. The distributed scheme has better performance potentials than the centralized one, but it poses the problem of keeping multiple physical copies of the same logical data consistent. This is known as the cache coherency problem.

In a message-passing scheme, data is communicated into blocks of a certain format defined by the communication protocol. The bus throughput is higher than in a shared-memory scheme, but latency of data transfer is higher since each message transfer requires packing of the data into the protocol-defined block of data by the master module, and depacking it by the slave module.

For a large number of processors competing for the bus, a single-system bus is a performance bottleneck. It is also unreliable, since the bus is the potential cause of a single-point system failure. Its effectiveness as the interconnect also depends heavily on the communication pattern between the agents. It is appropriate for one-to-many communication patterns (multicast and broadcast), but it is inefficient if most of the communication patterns are one-to-one between disjoint sets of agents. Only a single one-to-one communication can be provided by the bus at a given time. In the case of multiple writers, arbitration and bus hand-overs between the masters can be frequent, which reduces bus bandwidth. These problems can be decreased by using multiple busses.

On the other hand, implementation of one-to-many connection patterns on the bus is nontrivial. The broadcast requires a mechanism for a waiting for response from all selected modules and a mechanism for general addressing. The multicast is even more complex since it has to provide the means for selective addressing of specific sets of receivers.

Because of its simplicity, bus interface is appropriate for interconnecting a relatively small numbers of units. There are some fundamental limitations of bus interconnects that limit their application in emerging high-speed distributed systems. These are speed, bus length, and the number modules that can be attached to the bus.

The speed of the bus is limited by the stray capacitance of the units attached to the bus. With today's mature technologies and copper conductors, these speeds are limited to 200 MHz, which for a CPU clock speed coming into the range between 50 MHz and 100 MHz, can result in a performance bottleneck even for a very small number of CPUs. On the other hand, by increasing the number of units attached to the bus, the overall stray capacitance on the bus increases, which decreases the speed of data transfer. The crosstalk between the signals comprising the bus is also a problem. The increase in the number of receivers on the bus reduces the impedance on the bus, which imposes the need for high-current drivers that consume significant power.

In order to reduce these negative effects, manufacturers have introduced the BTL logic family, with longer rise and fall times, which reduce crosstalk. The voltage swing is lower than with TTL logic, which reduces the effect of increased capacitance on the bus.

The length of the bus must be small because the signal-switching speed is limited by the conductor's capacitance and inductance, and these both tend to increase with the increase of bus length. Practical bus lengths are limited to 30 cm.

The number of units that can be efficiently connected by the bus is limited. More units on the bus not only results in a smaller portion of bandwidth available for each unit, but also decrease available overall bandwidth, since increase in stray capacitance reduces switching speed. For these reasons, single-bus systems are not suitable for systems with more than a few tens of units.

The extension of the bus interconnect in distributed environments is the serial CSMA (Collision Sense Multiple Access) bus used at the Ethernet networks. Its basic limitations are speed (up to 10 Mb/s) and the capacity for only one sender at a time.

2.) Link

A link is the device that interconnects two units. Since there is a limit of two units that can be attached to it, the stray capacitance on the link is small and easily controlled. The links can be one directional or two-directional. The one-directional link provides higher transfer speed because of the simpler control and the number of devices attached to it, i.e., only one transmitter and one receiver.

The new fiber optics amplifiers technology is already used for commercially available links and interface devices for speeds in the GHz range. Improved coax copper conductor technology also approaches the GHz range.

The fundamental limitation of links is that the only interconnection topology that can be constructed by interconnecting links, without additional interconnecting devices, is the ring. Although a ring network can support throughput directly proportional to link speed independently of the number of units in the ring, the latency of the ring is linearly proportional to the number of units in the ring.

Even though links are not sufficient for the design of arbitrarily sized networks, they are necessary elements in any distributed interconnection structure.

3.) Switch

A switch is a device that connect n inputs to m outputs. A switch can be used as the interconnection network itself, or as a building block of the larger networks. There is a wide variety of switch architectures that are used for interconnecting any number of units that range from less then ten up to thousands of units. Architectural features of switches, also used as classification criteria, are topology, path selection method, multiplexing method, and connection pattern. In the following discussion it is assumed that the number of switch inputs is the same as the number of the switch outputs, which is true in most existing systems.

Topology

Topology describes the interconnection structure between the inputs and outputs of the switch.

1) Crossbar topology

In crossbar topology, every input can be connected directly to every output. The 8×8 crossbar switch is represented in FIG. 1. The crossbar switch 100 is strictly internally nonblocking, if the only permissible connection pattern is point-to-point. The price paid for maximal possible throughput is the square complexity, measured in the number of cross points. The other fundamental limiting factor of the crosspoint switch is the fan-in and fan-out requirement for inputs and outputs, respectively. The inputs 111–118 of the 8×8 switch represented in FIG. 1 must have fan-out capability to drive 8 outputs (121–128), and the outputs need the corresponding fan-in capability. These restrictions, and the inherent square complexity of the crossbar switch, render it impractical for very large numbers of inputs (hundreds or even thousands). On the other hand, because of its excellent performance parameters, it is an appropriate solution for switches with low numbers of inputs and outputs, especially for those serving as building blocks of larger multistage switches or interconnection structures of arbitrary topology.

2) Multistage topology

In multistage topology, inputs are connected to outputs indirectly through intermediate lower valency switches. The 8×8 three-stage switch 200 (Banyan network topology) is represented in FIG. 2, having inputs 111–118 and outputs 121–128. With a sufficient number of elements, multistage switches can be made internally strictly or rearrangeable nonblocking. The nonblocking requirements for multipoint connections are harder to achieve and analyze than for crosspoint switches. The latency through the multistage switch is larger than for crosspoint, and it is linearly proportional to the number of stages.

Multistage topology is actually a network structure. It is appropriate for regular and stable communication patterns. The emergence of heterogeneous and diverse computing and communication environments, services, and applications will require much more freedom in choosing network topology that will satisfy different connection patterns, bandwidth, response time, and reliability requirements.

Path Selection Method

The methods for selecting the path between source and destination are circuit switching and store-and-forward switching.

1.) Circuit switching

In the circuit-switching method, an end-to-end path is set up before any data is transferred, and the required bandwidth is kept reserved until the last data item is transferred. Although appropriate for telephone switching systems, this method does not satisfy the requirements of most data communication systems.

The delay for set-up in a large network can be very long, up to tens of seconds in duration, because of the problem of logical address to physical path mapping. On the other hand, the use of communication line bandwidth can be very low, in a case of sparse data communication, which is very typical in interactive distributed environments.

2.) Store-and-forward switching

In store-and-forward switching the session is initiated without reservation of bandwidth of communication devices on the path between source and destination. It has advantage over circuit switching in that each communication link is fully utilized whenever it has any traffic to send. The different routing strategies within store-and-forward path selection method include virtual circuit routing. Virtual circuit routing is store-and-forward switching in which a particular path is set up when a session is initiated and maintained during the life of the session. The routing and message recovery at the destination are relatively simple, but it does not adapt quickly to dynamic change in availability of alternate paths in the network. This scheme allows sharing of link bandwidth between the sessions on demand, rather than by fixed allocations as in circuit switching.

Multiplexing Method

Data from inputs of the switch may, and usually do, compete for the same switch outputs. There are two methods of choosing which input to multiplex to the output: synchronous and asynchronous, with the latter being the most important for purposes of the present invention. Asynchronous multiplexing is a connection-oriented method: the input is connected to the output only when the input requests it, and when there is no other higher priority input requesting it. A fairness scheme is applied for arbitration to assure that all inputs get an appropriate share of the output line bandwidth. There is no waste of the bandwidth of the output line, because it is never assigned to the input when the input does not need it.

The units of data transfers are fixed-length cells composed of few tens of bytes. The cell transfers through the switch are atomic.

This scheme is more complex to implement than the synchronous one. The asynchronous scheme requires both multiplex switching and label switching. The multiplex switching is the physical transfer of a cell from an input port to the output port. Label switching is translation of a connection identifier from one valid at the input port to one valid at the output port. Label switching is necessary to distinguish the data items coming from different inputs and merging at the output.

Since inputs compete for the outputs of the switch, there is a need for an arbitration scheme. The arbitration protocol is usually required to guarantee fairness, although in some applications there may be a requirement that some messages have higher priority than others. Arbitration is even harder to implement for multicast accesses, since, in addition to fair priority resolution, the avoidance of deadlocks must be guaranteed.

The asynchronous multiplexing method is the only approach that can accommodate the very diverse bandwidth requirements of integrated services networks.

Connection Pattern

In a multipoint connection pattern, input can be connected to multiple outputs of the switch simultaneously. These connection patterns are multicast if the input is connected to a selected set of outputs, or broadcast if input is connected to all outputs. The multipoint communication pattern is typical for many distributed applications with a high degree of data sharing. Multipoint capability of interconnects is desirable to improve performance, and to simplify data consistency algorithms.

SELF-TIMING

The synchronization of communicating entities can be done in globally centralized (synchronous) manner, or in a distributed democratic (self-timed) way through the mutual agreement of communicating agents. The later approach is much more suitable for distributed systems. The problems of applying centralized synchronization on a distributed system are the following.

The one central global synchronizer represents a reliability bottleneck of the system, since it is a single point of failure. It can also become a performance bottleneck, since synchronization of any two agents requires separate communication with the central synchronizer which generates an extensive number of messages in the network that have to be processed by the single synchronization entity. If the synchronization mechanism is a physical clock signal, its use in a distributed system imposes problems of clock skew, due to the physical distribution, and clock driving capability if it has to synchronize many units. Thus, scalable modular design of complex high performance distributed systems requires use of the self-timing approach from the system specification to the actual physical design. The implications of the self-timing approach on the actual hardware design as now discussed.

In synchronous digital hardware designs, all state changes are performed with respect to the global clock signal. In asynchronous designs all state changes are driven with signal transitions, without use of any common global clock reference. The asynchronous design that functions independent of relative logic delays is called self-timed, or speed-independent.

The synchronous design approach has been the most prevalent approach in current digital systems. The alternative, the asynchronous, has been given less attention because of its inherent problems, like hazards and race conditions. The other fundamental difficulty that prevented asynchronous implementation of very-high-speed systems was the speed penalty of the two-way handshake protocol in asynchronous interface logic networks due to the slow logic circuits that were available.

Technology and design concepts have changed so that the asynchronous approach is today more advantageous than the synchronous one. The complexity of contemporary digital systems requires a modular design approach. Large systems require large numbers of modules that very often cannot be placed close to each other. The distribution of the global clock in this case gives rise to clock skew problems, in which, due to different propagation delays of clock signal throughout the system, different system modules can sense clock changes at different instants. This problem grows with the increase of clock frequency, since relative skew delay becomes larger.

The solution to clock skew problem requires the use of multiple phase clocks, which reduces effective clock frequency. This is not acceptable in today's designs, which are using logic circuits that have significantly smaller delays than the physical limits of clock circuits, and where clock speed has already become a performance bottleneck.

The availability of CMOS logic gates with delays that go below 1 ns has significantly reduced the inherent performance penalty of the two-way handshake protocol of asynchronous interfaces. On the other hand, clock rates of more than 50 MHz are difficult to obtain, and where they have been achieved they require a good deal of effort. Thus, new technology has a major impact on choosing an asynchronous design over a synchronous design. The function of correct hazard-free self-timed design does not depend on circuit delays. The choice of implementation logic technology and speed influences only performance, but not correctness of functions. Logic families can be freely mixed as long electrical interface constraints are respected. As technology improves and logic gate delays decrease, the implementation can be changed without any change in design.

"Scalability" is becoming a very important issue in contemporary system designs, since performance and functional requirements change rapidly and often unpredictably. The design must be robust to changes in functional and performance requirements, with the ability to increase capacity by adding more modules without any architectural or design changes.

The self-timed design enables and enforces modular design, which is one of the fundamental assumptions of scalability. Since there is no global clock, thereby eliminating the problem of clock distribution, system modules can be easily physically separated and distributed. The delay independence allows the interfacing of modules of the large variety of speeds. On the other hand, its insensitivity to logic delays enables use of faster technologies that may appear even after design has been finished, without any change in logic design.

Self-timed designs have not been used widely partly due to their inherent complexity and other problems that either do not exist in synchronous systems or that are easier to solve by clocked designs. Self-timed systems are based on the concept of signal transition. The system evolves in time through its states due to the causal relationships between the signal transitions. There is no driving force and centralized states scheduler such as a global clock in synchronous design. Since unrelated signal transitions can be performed independently, self-timed systems have inherent distribution and concurrence.

"Liveness" is the property of self-timed systems that states that a system will evolve through its states as long as input signals that cause state transitions keep changing. In other words, a self-timed system with liveness property has no deadlock state. By definition, a self-timed system satisfies liveness if every state can be reached from any other state through the appropriate sequence of input signal changes. The delay independence property of self-timed circuits states that a circuit should behave in the specified manner independent of the delays through its constituent elements. The specification of self-timed circuits are causal relationships between signal transitions. The signal transition is a change in a signal state from low voltage level to high voltage level, usually referred as a positive transition. The domain set of a particular signal transition is a set of signal transitions caused by it. In the terms of self-timed circuit specifications, delay independence states that every signal transition should cause transitions of signals in its domain set, regardless of the delays through the circuit.

Asynchronous circuits that do not fulfill this requirement are not self-timed. The dependence of system behavior on circuit delays, the essential hazard, means that the delay-dependent circuit is susceptible to race conditions. The delay independence property states that a circuit will behave as intended, i.e., that specified events (signal transitions) will happen in response to signal transitions. It does indicate if non-intended events may happen in a particular implementation. Hazard-free requirements address system implementation, stating that no undesirable events will occur at system outputs as a response to signal transitions.

Undesirable events at the output are of two types: a change in output that should not occur (static hazard); and an intended output change that mistakenly occurs more than once (dynamic hazard). Hazard-free implementation eliminates both hazard types.

In self-timed systems, non-susceptibility to hazards and delay independence are achieved by proper logic design, by ensuring that any signal transition is not reversed until all signal transitions in its domain set are performed.

The functional blocks of self-timed systems can be divided in computation and interconnection blocks. The implementation (synchronous or self-timed) of computation blocks is irrelevant as long as it appears to the outside world as a self-timed unit, i.e., it generates a completion signal that denotes the readiness of results. Most commercially available processing and memory components do not provide a completion signal, but its operation can be mimicked in different ways. The interconnection blocks are those that operate in a self-timed protocol.

SUMMARY OF THE INVENTION

These problem areas as well as other shortcomings and limitations of the prior art are obviated, in accordance with the present invention, by a distribution element that enables integration of distributed high performance computing and peripheral units into the unified user environment that offers simple programming environment by hiding the multiplicity and distribution of resources from the user, and which efficiently exploits the high bandwidth of current transfer media.

Broadly, in accordance with the present invention, the distribution element for interconnecting hosts and links is composed of a crossbar matrix and a plurality of ports which are coupled to hosts, links, and the crossbar matrix. Each of the ports includes: a node receiver for receiving incoming host data from a corresponding one of the hosts, for receiving first switched data from the remaining ones of the ports via the crossbar matrix, and for transmitting outgoing link data to a corresponding one of the links; and a bridge receiver for transmitting host data to a corresponding one of the hosts, for receiving incoming link data from a corresponding incoming of one of the links, and for transmitting second switched data to the first receivers via the crossbar matrix. In addition, the node receiver is arranged to receive node data from the bridge receiver.

The data transfer rates supported are at the order of Gb/s. The distribution element is suitable for creation of arbitrary size and arbitrary topology networks by replication of the distribution element and connections between them using directional communication links without any additional devices. The problems solved and functions supported by the distribution element are the following.

In order to make a distributed computing environment attractive for the user, the programming model is not significantly more complex than in traditional single user environment. For that purpose, the distribution element provides each application with synchronization mechanisms that are directly accessible and easy to use, in order to effectively, simply and flexibly control sharing. The communication is transparent to the user by making it a side effect of computation through the user-defined sharing patterns. For that purpose, the distribution element provides architectural support for memory abstraction of the network.

The functional support for synchronization, sharing and coherency control is necessary for effective implementation of memory network abstraction. The variety of sharing and connection patterns is supported by a multicasting transfer capability.

In order to make efficient use of high bandwidth transfer media, the complexity of conventional communication protocols have to be significantly reduced. The distribution element provides direct and effective support for locally autonomous lossless data flow and routing control.

In order to adapt to varying user environments, support for scalability with respect to the size and topology of the network, as well as to the speed of transfer medium and peripheral interfaces, is very important. The support for easy integration into the existing network environment by auto configuration and reconfiguration is provided for simple and modular network growth and change.

For easy integration of devices having a large variety of processing speeds and I/O rates, the distribution element supports demand-based communication resource sharing mechanisms. Self-routing control is provided in order to achieve high throughput. Distributed control is enforced in order to avoid processing bottlenecks.

The implementation is scalable so that distribution elements can be integrated into the interconnection media of different topologies and performance.

The distribution elements implement lossless flow control without reservation.

Reliability is important for every complex system. The distribution element provides the ability for selective and scalable improvement of reliability through replication of resources.

BRIEF DESCRIPTION OF THE DRAWINGS

The teachings of the present invention can be readily understood by considering the following detailed description in conjunction with the accompanying drawings, in which:

FIG. 20 depicts a L1 level instruction execution as multiplexed memory based on a set of state machines;

FIG. 21 shows the correspondence of bits in the "guards" field to the ports of the distribution element;

FIG. 22 illustrates the addressing space of the bridge's receiver;

To facilitate understanding, identical reference numerals have been used, where possible, to designate identical elements that are common to the figures.

DETAILED DESCRIPTION

Figure 1:
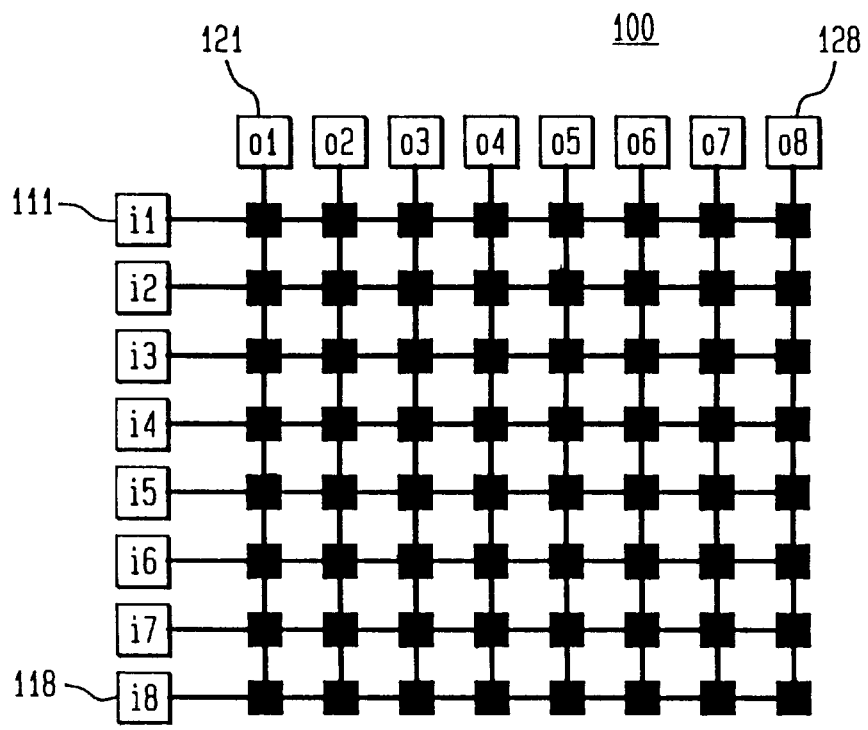
FIG. 1 shows an illustrative prior art crossbar switch.
Figure 2:
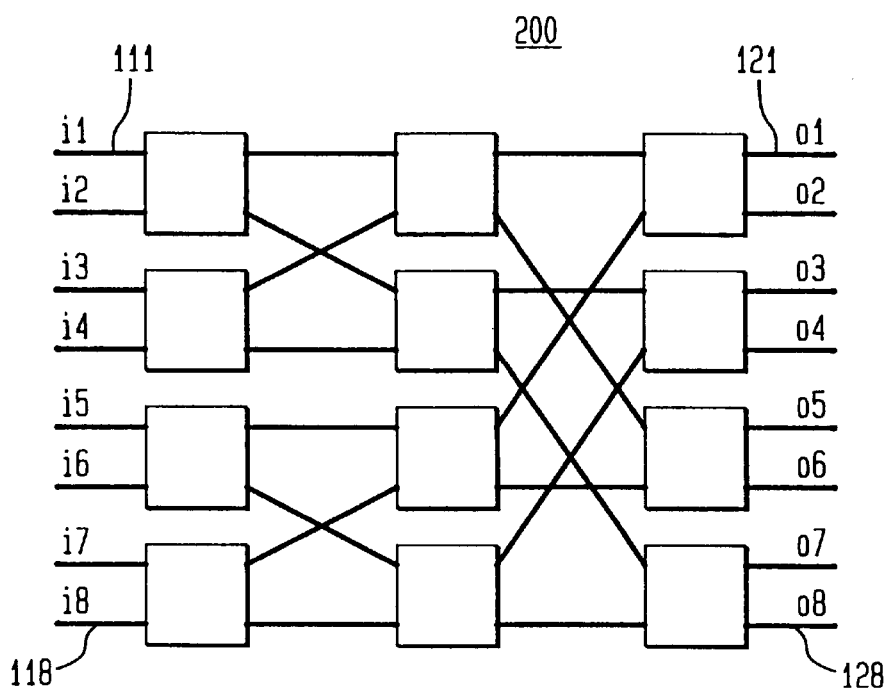
FIG. 2 shows an illustrative multistage switch.

After considering the following description, those skilled in the art will clearly realize that the teachings of my invention can be readily utilized in providing distributed networks. In this description, so as to gain an insight into the underlying principles in accordance with the present invention, the programmable distributed element, and concomitant methodology, is initially described in overview fashion. Then, the architecture of the distributed element is presented at a block-diagram level to gain additional insight into the structure and operation of the distributed element. Finally, the description is completed by providing the details of the components comprising the distributed element.

OVERVIEW

The directly programmable distribution element in accordance with the present invention provides a modular device for building networks of arbitrary size and topology that will efficiently exploit the bandwidth of high speed transmission media, and provide functional abstraction of the network that will enable creation of a distributed computing environment through a simple programming interface.

The architecture of the directly programmable distribution element is based on the memory abstraction of the network by providing mechanisms for efficient and transparent sharing of global name space. These mechanisms are deterministic lossless flow control, synchronization, controlled coherency support, self-routing, variable length block transfers and proper sequencing of atomic data elements within the message throughout the network from source to destination.

Direct programmability of the distribution element is chosen as the only means for achieving maximal performance, because direct programmability eliminates time consuming communication between a data transfer fabric and a conventional-type network controller, and eliminates the need for communication protocols between controller and hosts. The distribution element's functions enable their easy integration into networks of arbitrary size and topology, and effects simple and direct interface of distributed application programs to such a network. The functions of the distribution element directly support shared global object name space of distributed applications. Those functions can be accessed directly by applications through the instruction set of the distribution elements.

The functions of the distribution element belong to two categories. One category is a high-level set-up and monitoring function. This function is rarely performed and thus it is not executed directly by the distribution element but rather by a control processor that writes set-up information into the control memory of the distribution elements. The other category relates to functions that support sharing of objects between hosts in the network whose interconnection path through the network is already set-up by the first category of instructions. These functions are completely supported and directly executed by execution units of the distribution elements. The functions are specified by the instruction set of the distribution elements and execution of the functions does not involve any protocol execution by network control processors.

Thus, remote applications communicate with each other by invoking the distribution element's functions directly, through its instruction set, without involvement of operating system or network communication protocols. This is made possible by providing the distribution elements with the same programming paradigm used by distributed applications. The distribution element supports object sharing by the distributed applications reliably regardless of data traffic requirements and bandwidth availability.

The functional abstraction of the network provided by the distribution element to applications is discussed next, followed by a description of the functional characteristics and topology of the distribution element.

1.) Network Abstraction

Figure 3:
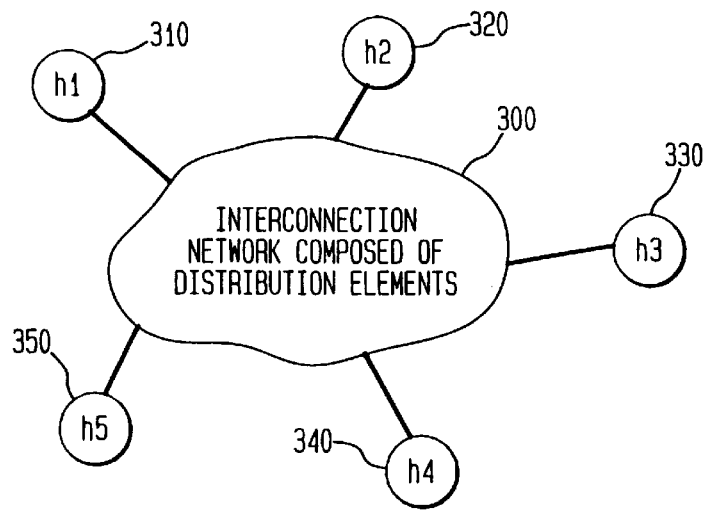
FIG. 3 illustrates a general distributed computing system.

This section presents a motivating discussion of functions provided by the interconnection network, having embedded distribution elements, to the applications. An illustrative example network 300 with five hosts 310–350 interconnected by network 300 is presented in FIG. 3

Figure 4:
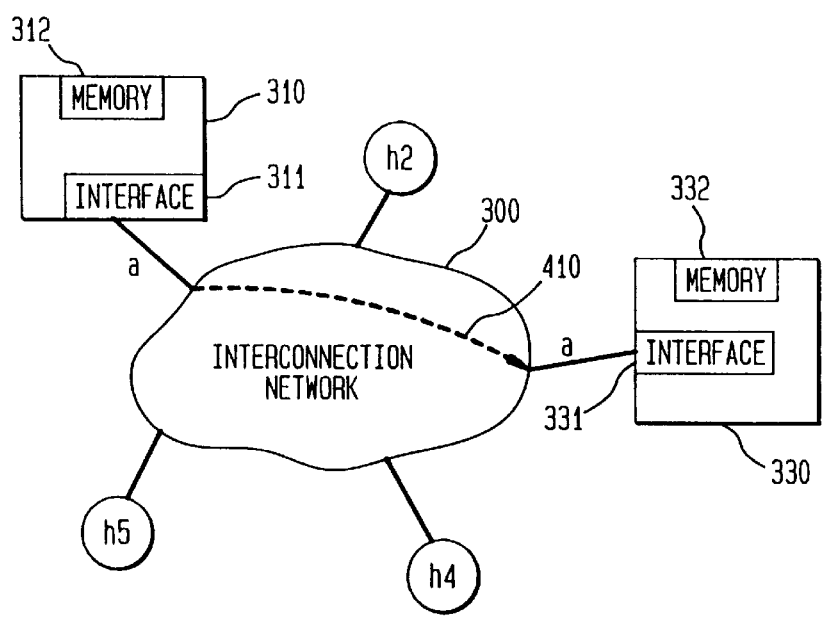
FIG. 4 illustrates a point-to-point directed path in the system of FIG. 2.

It is supposed that one application on host 310 (h1) decides to share one object a with another application in the network. Host 310 will send a tune_in(a) request to network 300. This request is a path initialization function that is propagated by the embedded distribution elements to their control processors that will set up the path towards other units (hosts) in network 300 that want to share object a, if there are any. If there are no other units in network 300 that share object a, the distribution element connected directly to host h1 will note that h1 wants to share object a, i.e., object a will be exposed at that point. Now it is supposed that host 330 (h3) decides to share object a, so host 330 will submit a tune_in(a) request to network 300. As the result, with reference to FIG. 4, directed path 410 through the network will be established between h1 and h3 corresponding to object a. Host h1 is at the root of the path and host h3 is at the leaf of the path. The direction of the path denotes its orientation, but data can be sent in any direction. Data is sent within synchronization cycles, where each cycle has two phases, namely, a write phase and a read phase. During the write phase, data is propagated from the leaf (h3) to the root (h1) on path 410, and in the read phase data is propagated in the opposite direction. The synchronization mechanism and path orientation are introduced in order to control data sharing and enforce coherency of shared-memory, as explained later.

If host h1 updates object a, h1's network interface 311 (shown in FIG. 4) detects that a write access to the network shared object was made and transfers the new value of object a to network 300. Host interface 311 formats the data so as to be compatible with the distribution element's instruction set. The objects are propagated across the network in the fixed size frames; there can be any number of frames in the object. Each frame has a header that contains the distribution element's instruction and data load. All frames that are inserted into network 300 by a host will be delivered to destination(s) without loss and in the same order that they were transmitted. Since host h3 is the only other unit in the network tuned into object a, point-to-point data transfer is performed between host h1 and host h3. The first frame of the data transfer session contains a start_fp(a, data) instruction that denotes the initial frame of the object sent in the forward propagate direction (start forward propagate), the subsequent frames have a cont_f(a, data) instruction that denotes middle frames of the object (continue forward propagate), and the last frame of the object has an end_fp(a, data) instruction that denotes the last frame of the object (end forward propagate). Host interface 331 of h3 will receive all frames of object a in the same order they were sent, and interface 331 re-packs the object in the format used to represent it in h3's memory 332, and writes the object into h3's memory.

Thus, communication network 300 supports memory abstraction even in the simplest point-to-point connection. Rather than doing explicit I/O as in the current networks, each host performs a write to the shared object, and network 300 access is performed as a consequence of the write operation and shared status of the object.

For comparison purposes to highlight the paradigm just illustrated, the execution of the same write operation in an I/O abstraction-based network is considered; such an execution is complex. In an I/O network, each write to the shared object must be followed by an I/O operating system call for data transfer. This is slow since it requires program context switching. The operating system transfers data to the network, giving it the explicit physical address of receiver host h3. When data reaches h3, the network operating system has to reconstruct all frames of the object transmitted separately, order them appropriately, and ensure that all frames arrived. Since the network does not guarantee that all frames will arrive at the destination, the first concern is how long should h3 wait to receive all frames until it eventually decides that a loss has occurred, whereupon h3 requests h1 to re-transmit missing frames. When all frames arrive at the destination, after possible eventual retransmissions, the network operating system will inform the local host operating system that data is ready and each local operating system in turn informs the applications. All this requires involvement of multiple layers of network protocol for flow control, loss detection and recovery and local operating systems for translation between different programming and networking paradigms. Moreover, data sharing is much more complex than this simple example of data transfer. It requires controlled access to a shared object to ensure that all copies of the objects in the network are consistent. Current networks provide no provision for sharing, but rather leave control and overhead of sharing completely to the application.

The need for control of sharing can be illustrated using the previous simple example as a basis. It is suppose that h3 decides to update object a in the same time interval that h1 is updating object a. Then h3 will send data to h1 and h1 will send data to h3. Without any control of sharing, the results of updates at both hosts will depend on the relative speed of hosts and the network paths, i.e., the results of program execution will be unpredictable. This result gives rise to the so called problem of shared-memory coherency.

The distribution elements in accordance with the present invention provide direct support for coherency of shared data by a logical synchronization mechanism and object ownership. The synchronization mechanism is a "logical clock" that keeps all distribution elements tuned into the object within the same synchronization cycle by mutual agreement. There is a set of distributed element synchronization instructions, explained later in the description of the architecture, which provide the logical clock synchronization function. The logical clock cycle is divided into phases, and the synchronization protocol ensures that no unit enters the next phase before all units have completed the previous phase. The first phase of the clock is a write phase and second phase is a read phase. All units that update the object at the particular cycle do so in the write phase, and all units that are tuned into the object receive the new value of the object in the read phase. There is one owner of the object during each particular logical clock cycle; the owner mediates all write operations received during the write phase, and propagates mediated values to all units tuned into the object at the read phase. The owner is the host located at the root of the directed path, and the owner is denoted as a captain. All other hosts tuned into the object are at the leaf(s) of a path and they are denoted as guards.

The multiple write example is controlled with the following mechanism. Host h1 is the captain and host h3 is the guard for the object a. Host h3 will start a write phase by sending a force(a) synchronization instruction (part of the distribution element's instruction set) towards the captain (h1) in a backward propagate direction. The first frame of the object will be denoted by a start_bp(a) instruction (start backward propagate), followed by sequence of cont_bp(a) instructions (continue backward propagate instruction), and the last frame of the object is transmitted by a snap(a) instruction that completes the write phase of a cycle. Host h1 will enter a read phase after mediating between the update of object a performed by h3 and h1's own update of the same object. The mediated value is transmitted by h1 back to h3 in a forward propagate direction, with the sequence of instructions start_fp(a), cont_fp(a), cont_fp(a) . . . cont_fp(a), end_fp(a). The read phase of a logical clock is completed by discharge(a) synchronization instruction, sent in a forward propagate direction after the end_fp(a) instruction.

Figure 5:
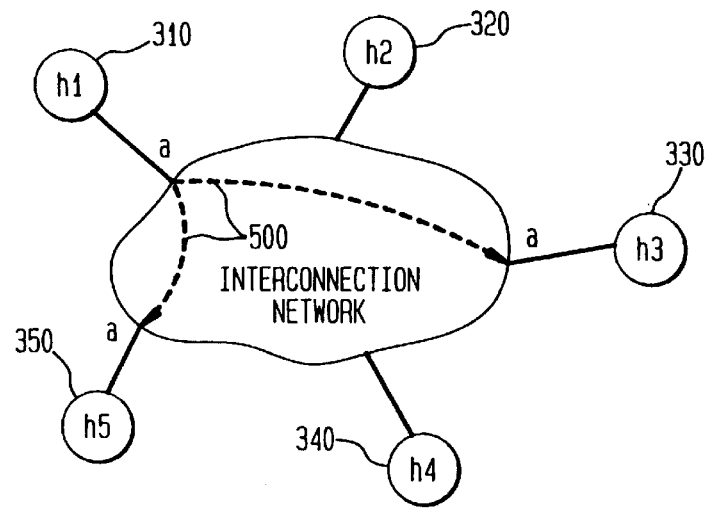
FIG. 5 illustrates a multi-point directed spanning tree in the system of FIG. 2.

It is supposed now that h5 issues a request for tuning into object a. As the result, the path from h1 to h5 will be set up throughout the network, and the "spanning tree" of the multipoint connection pattern corresponding to object a will be created. It is represented by tree 500 in FIG. 5.

Host h1 is at the root of the tree and it is denoted as the super captain in order to distinguish it from captains inside the network that are roots of subtrees of the same spanning tree. Hosts h3 and h5 are guards. There can be only one super captain host in the network, which acts as the owner of the object in a particular cycle, and all other hosts in the network tuned into the object are denoted as guards.

Figure 6:
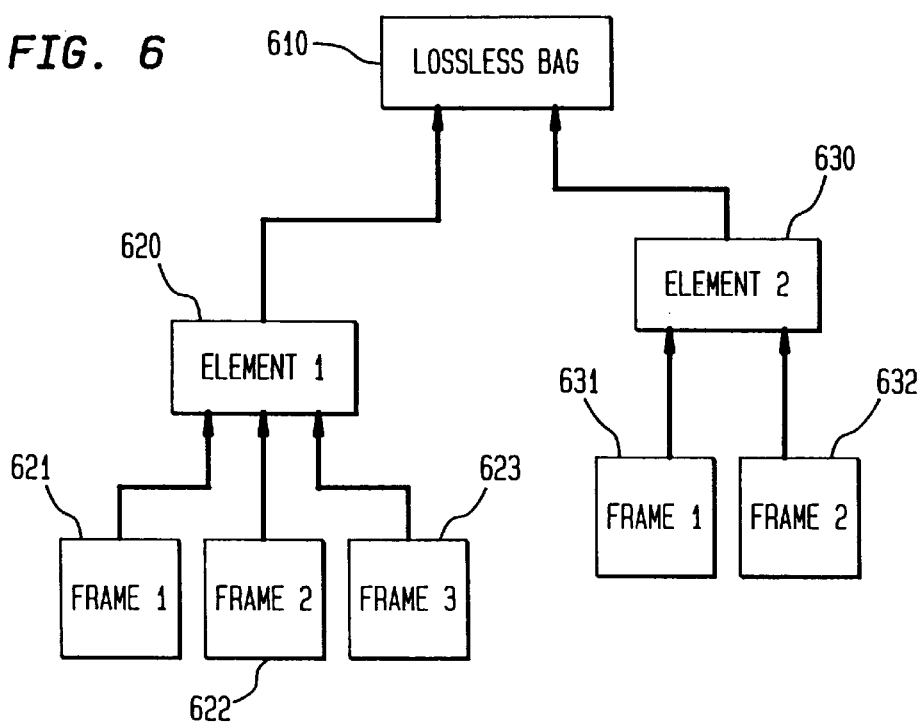
FIG. 6 illustrates the relation among frames, elements, and the "lossless bag" in accordance with the present invention.

Global object memory coherency is maintained in a multipoint connection in the same manner as in the point-to-point connection from the previous example. Guard hosts (h5 and h3) will transfer data frames corresponding to their updates of object a, in a write phase. Each guard host can send multiple updates of the same object in the same write phase, and each update will constitute one element of the object update in a particular cycle. All elements from all guards in the network writing in a particular cycle are propagated in a backward direction towards the super captain; all the elements grouped together comprise what is referred to as a "lossless bag". Each element can have an arbitrary number of frames. All frames within the element are propagated towards the destination (super captain) without loss and in the same order they where generated by each coffesponding host. The relationship between frames, elements and the lossless bag is shown in FIG. 6. Element 620 is composed of three frames 621–623, and element number 630 is composed of two frames 631–632. Then, lossless bag 610 is made up of elements 620 and 630.

The write phase will be over when host h1 receives a snap(a) instruction from both guard hosts. At that moment host h1 has received all elements of lossless bag 610. After eventual mediation by h1, the super captain, h1 starts the read phase by transmitting frames of the object in a forward propagate direction towards all guards that decided to read in the particular cycle. Each guard selects during the current cycle if it wants to read data in a next cycle or not. This reduces the number of data transfers in the network, since data frames are not propagated across the branch of the subtree that leads to the host if that host is not interested in the value of an object in a particular cycle.

In order to reduce the number of transfer cycles in a forward direction, when the super captain sends data to multiple guards, the internal distribution elements perform multicast transfers. With the multicast access feature, the number of transfer cycles performed in a forward propagate direction is logaritmically proportional to the number of nodes on a spanning tree, rather than linearly as it would be if there is no multicast capability.

The data coherence scheme presented in a previous example is a multiple-writer, single-owner scheme. It is efficient if data sharing patterns are such that multiple updates of the object from multiple sources are frequent. If data sharing pattern is such that updates are generated from the single source for a significant interval of time, a single-writer technique in which only one host is allowed to update the value of object at a particular cycle is more efficient. With the distribution element in accordance with the present invention, the single-writer technique is implemented by granting write access for a particular object only to the super captain. The data transfers are propagated only in forward propagate direction in a multicast fashion, thus significantly saving the number of data transfers over the two-way backward-forward protocol from the previous example. In order to facilitate transfer of write access directly from one host to another host, the distribution elements have the capability to reorient the spanning tree during the data transfer cycle. The reorientation request is sent as the operand of the synchronization instruction, and thus the reorientation procedure does not require any additional time in access to normal data transfers and synchronization.

2.) Distribution Element Characteristics

The characteristics of the distribution element which supports the network abstraction model described in the pervious section are now discussed.

The topology of the distribution element is sufficiently flexible for the creation of spanning trees for data paths of arbitrary configuration and size. The topology provides for the multiplexing of multiple spanning trees in time, since paths of multiple shared objects may overlap. The multiplexing is demand-based in order to flexibly integrate data sources of a variety of data rates, and efficiently utilize the transfer medium. Data rates of up to 1 Gb/s are supported. Efficient multicast communication is effected in order to facilitate data sharing patterns illustrated in the previous section.

The object name space in a large network can be huge, on the order of up to $2^{64}$, which is the size of viral memory address space of modern microprocessors. At the same time, the number of actively shared objects is going to be much smaller. Since the number of actively shared objects determines the amount of state and control memory of the distribution elements, it is effective to map a larger persistent object name space into much smaller active name space.

The host interface (e.g., interface 311 of FIG. 4) supports a variety of speeds without sacrificing a large bandwidth of the distribution elements by dedicating them to slow hosts. The interface offloads the host from any data flow control processing, since processing speed is much smaller than data transfer speed.

The synchronization mechanism thus is directly supported by the distribution elements, for implementation of the coherency scheme described earlier, as well as for providing a general synchronization mechanism between remote units. The reorientation of the spanning tree is implemented in an efficient and safe manner so that it does not corrupt ongoing traffic.

Moreover, the distribution element provides flow control directly in order to avoid losses, minimizes waste of communication network bandwidth due to flow control, and minimizes network loading with data frames dedicated to congested traffic.

The distribution element is scalable as well as modular so that networks can easily grow by integration of distribution elements and data transfer media. Live insertion, and auto-initialization and configuration are also supported in order to simplify integration.

ARCHITECTURE OF THE DISTRIBUTION ELEMENT

The Background of the Invention section has suggested that maximum bandwidths are achievable by using non-sharable media, i.e., links. The class of distribution elements that offer maximal parallelism of independent connections is a switch. Thus the switch topology is selected for the distribution element, with the external interface through one-directional links; the architecture for the distribution element 700 is shown in high-level block diagram form in FIG. 7. Distribution element 700 provides full connection among four identical ports 710, 720, 730, and 740. Each port provides a full duplex interface to the external long distance serial network link, and a full duplex 40 bit parallel interface to the local host. For example, port 710 (also referred to as Port 1) has input 711 interface (HI) and output 712 interface (HO) connected to a host (not shown), and incoming link 713 (NLI) and outgoing link 714 (HLO) for connecting to a full-duplex serial network link. Other ports are arranged in substantially the same manner. Each port 710–740 provides 1 Gb/s bandwidth in each direction. The bandwidth of each port is shared between network link and local host interface. The multicast addressing capability provides flexibility of addressing patterns, and efficient multipoint connections. The connections are established on request with demand-based bandwidth assignment.

To reiterate, the external interfaces to each port are: NLO (Network Link Output), NLI (Network Link Input), HI (Host Input) and HO (Host Output). One full duplex network link (NLO and NLI) and two ports of distribution element 700 on the two ends of the link comprise one bridge. A bridge is the fundamental or basic building block of a network such as network 300 of FIG. 3, rather than the distribution element itself, as will be explained shortly.

The four ports of distribution element 700 are fully interconnected by Crossbar Matrix (CM) 750 shown at the center of distribution element 700. There is a latched path from each port to every other port of distribution element 700 through matrix 750, including a path from the input to the output side of the same port. The four ports of one distribution element, together with CM, are referred to as a node in the sequel.

Figure 7:
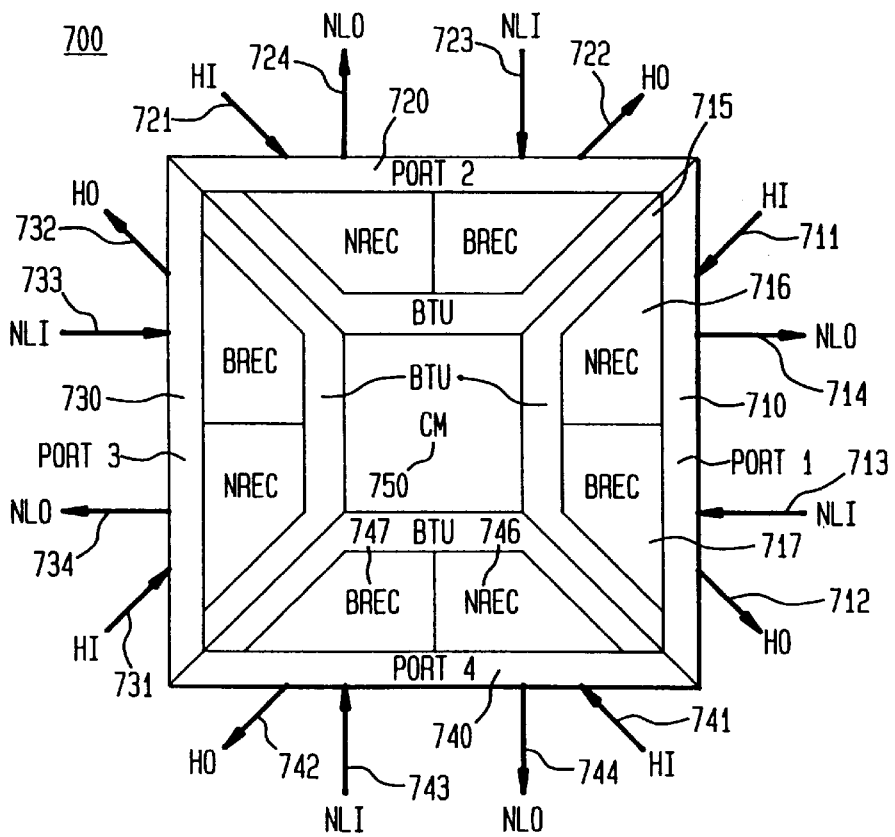
FIG. 7 depicts a generalized block diagram of the fully configured distribution element in accordance with the present invention.
Figure 8:
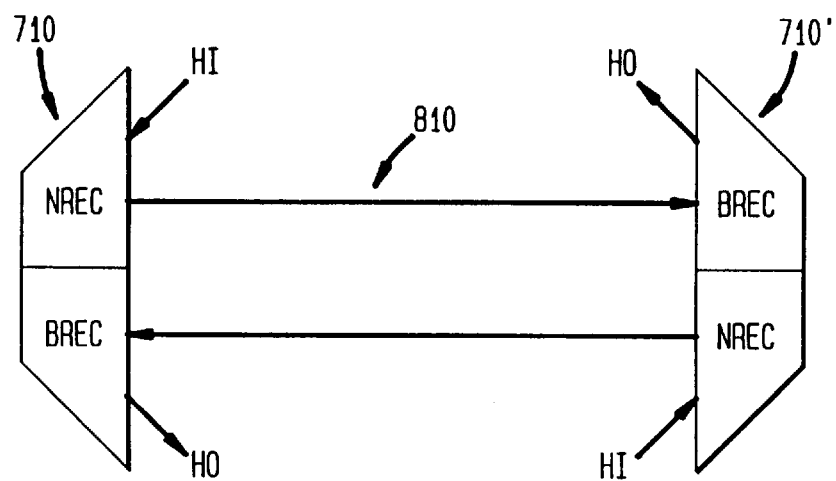
FIG. 8 depicts a general block diagram of a bridge composed of one duplex link and two ports from distribution elements.

The operation of each port is completely independent from the remaining ports of distribution element 700. As special cases, distribution element 700 can have a variable number of ports from one through four. If there is only one port, then distribution element 700 is typically used to interface its local host to the network link, and there is no need for CM 750. Thus, with reference to FIG. 8, the simplest distributed configuration consists of one full duplex link 810 and two separate ports (710 and 710') from two individual distribution elements at each end of the duplex link. The configuration of FIG. 8 is referred to as a bridging arrangement, and is the reason for considering the bridge as the basic building block of the network. In order to be consistent with that notion of modularity, a port of a distribution element is denoted as Bridge Termination Unit (BTU); the BTUs of FIG. 7 are shown by reference numerals 715, 725, 735, and 745, respectively. Each BTU is composed of two functional blocks: (i) Bridge RECeiver (BREC) which (a) transmits data to the associated host, (b) receives data from the associated incoming link, and (c) transmits switched data to the other ports via the CM; and (ii) Node RECeiver (NREC) which (a) receives data from the associated host, (b) receives switched data from the other ports via the CM, and (c) transmits outgoing data to the associated link. BREC 717 and NREC 716 of port 710 are exemplary. BREC 717 transmits data over host interface 712, receives data over link 713, and transmits data via CM 750 to NRECs 716, 726, 736, and 746, as required. NREC 716 receives data from host interface 711, receives data from BRECs 717, 727, 737, and 747, as required, and transmits outgoing data over link 714.

Figure 9:
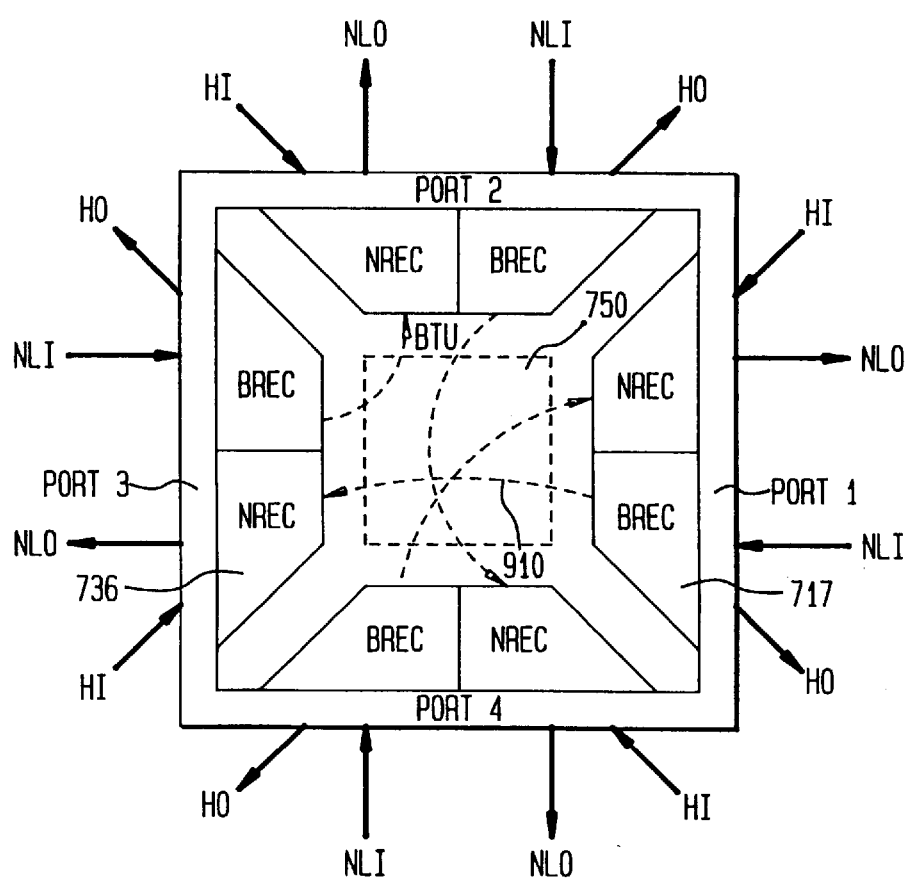
FIG. 9 depicts the interconnection pattern through the distribution element for non-conflicting connections.

Each BREC can transmit to the set of four NRECs in a multicast fashion. Since each NREC can process one data transfer request at a time, there can be up to four non-conflicting parallel connections between the ports of distribution element 700 at a time. This arrangement is presented FIG. 9 wherein, for example, BREC 717 connects to NREC 736 via connection path 910 through CM 750.

Figure 10:
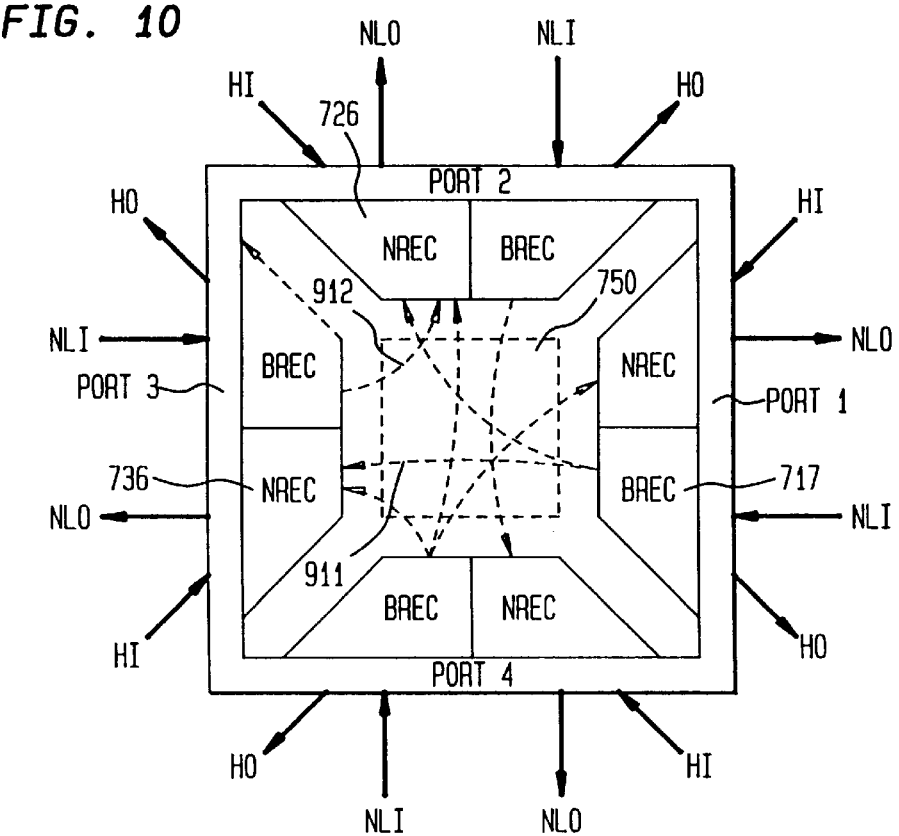
FIG. 10 depicts the interconnection pattern through the distribution element for conflicting multicast connections.

Also, there can exist conflicting requests from multiple ports for the same NREC. The arrangement with conflicting requests, including multicast requests, is represented in FIG. 10. In particular, BREC 717 is connected to NREC 736 via connection path 911, and to NREC 726 via connection path 912. The conflicting requests are arbitrated by a round robin priority technique in order to ensure fairness for requests from all sources. The round robin scheme changes priorities of requests on a regular basis, so that on-the-average all requests have highest priority for the same number of times. In the arrangement of distribution element 700, priorities are shifted after each atomic transfer cycle, so that the input from which a transfer is just completed has the lowest priority in the next cycle. A multicast addressing scheme substantially complicates arbitration, because of the possibility of deadlock. This problem and its solution are discussed later in this section.

Figure 11:
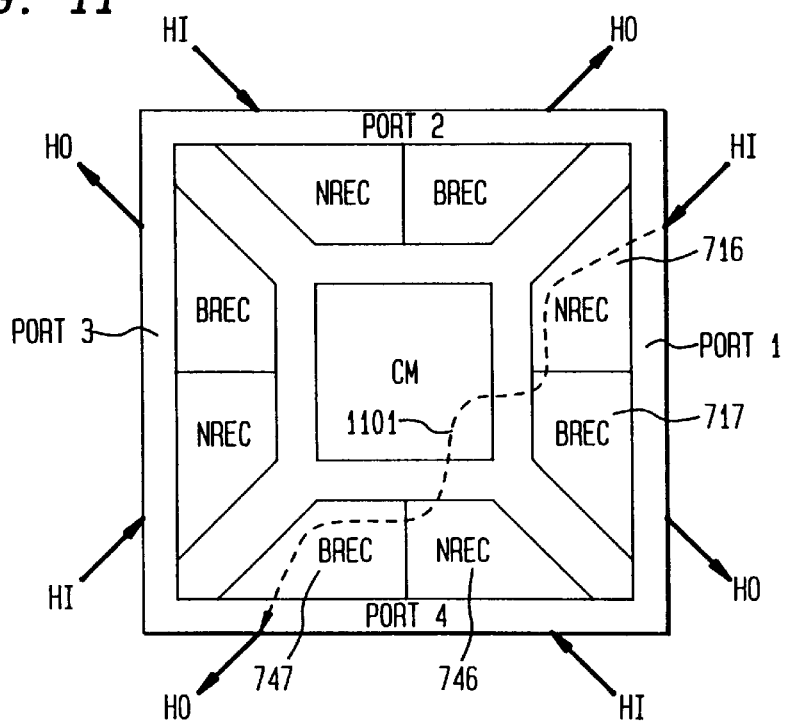
FIG. 11 depicts the distribution element as a stand-alone interface between hosts.

Distribution element 700 can be used as a stand-alone interface device that connects up to four hosts. This configuration, with reference to FIG. 11, includes the whole data path 1101 from one host associated with port 710 to another host associated with port 740, via NREC-BREC pair 716, 717, through CM 750, to NREC-BREC pair 746–747.

Figure 12:
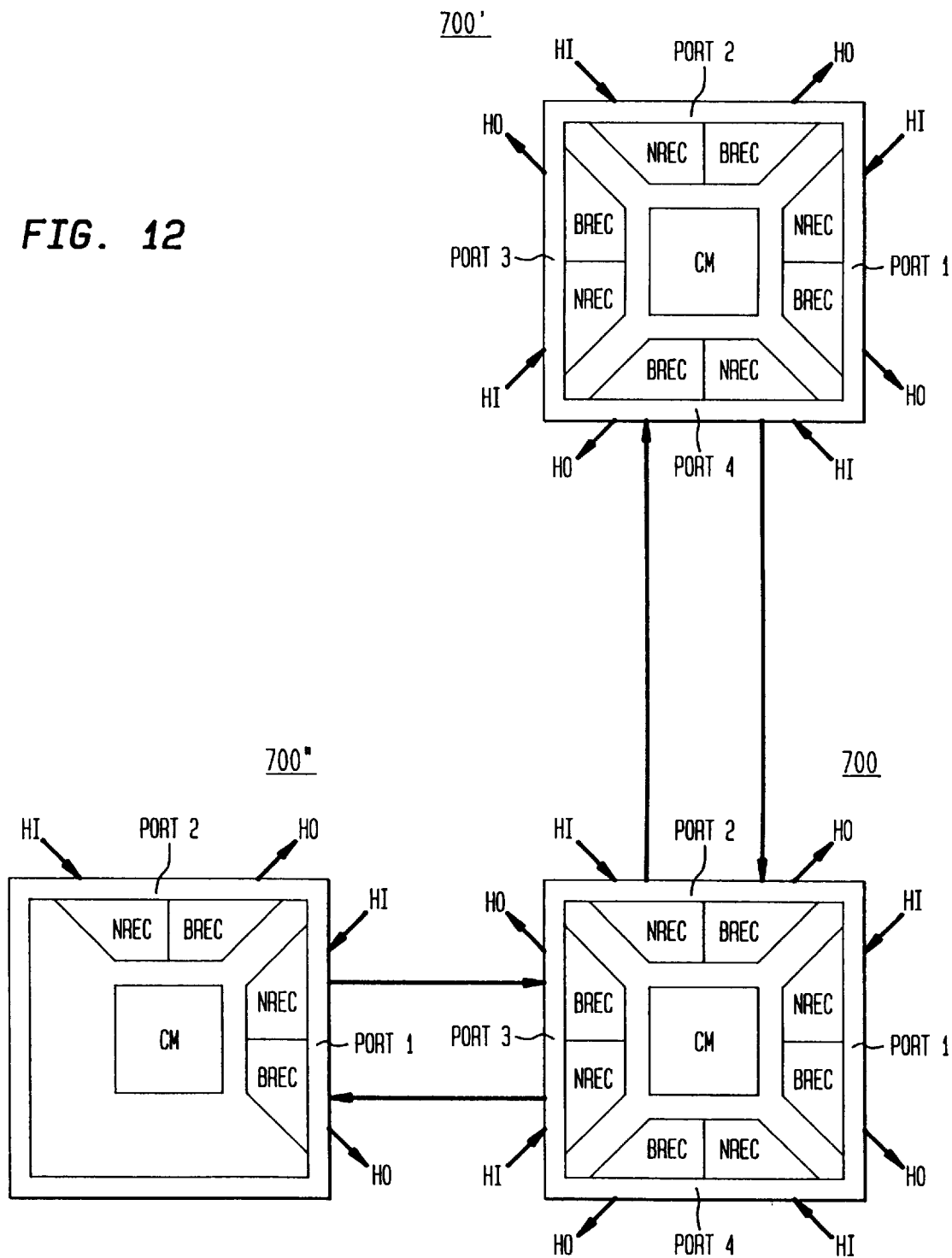
FIG. 12 depicts a plurality of distribution elements, some fully utilized and some partially utilized.

Distributed networks of arbitrary topology can be build by replicating the distribution elements as modular building blocks and configuring complete or partial distribution elements, from BTUs at their ends, at the network nodes. One network topology with a complete (all four ports) distribution elements (700 and 700') and an incomplete (less then four ports) distribution element (700") is depicted in FIG. 12.

Functional Characteristics and Organization

1.) Shared Global Memory Model and Naming

The architecture of directly programmable distribution element 700 is based on memory network abstraction. All network data transfers are treated as references to the global shared virtual memory space. The instance of the shared object at the particular host is the local copy of the object, and there can exist any number of them in the network. The connection between the physical copies of a shared object is based on the reference to the same global name.

In order to explain the addressing scheme, the notion of "tuning in" to the object and object exposure is now elucidated. Every host of the network, which has the local copy of a shared object, as well as every port of each distribution element that is on the routing path of that object, is said to be tuned into it. Since references are made with respect to the global names of the shared object, rather than the physical addresses of the nodes on which these objects are, all that is needed for routing is the information about which of the neighboring nodes are tuned into the particular global name. All that is required for network addressing at the host interface is to know whether the referenced object is exposed, so that the local references to that object are propagated into the network.

The interconnection path through the network, which connects local copies of the shared object corresponding to the particular global name, can be represented by a directed tree with hosts tuned into the object being at the root and leafs of the tree, and distribution element ports on the routing path being on the inner vertices of the tree. The interconnection path is denoted as a spanning tree corresponding to the object. The data transfer across the interconnection path can be done in either direction. In order to route the data, every port has to know which one of its neighboring ports is tuned into the name, and what is the orientation of the tree.

The size of the routing information is proportional to the valency of the distribution element, rather than the number of nodes tuned into the name, which makes the addressing scheme scalable with the size of the network. The addressing scheme is also robust with respect to mobility. If the shared object moves from one host to anther, the routing information is updated only in those ports which are on the spanning tree path dedicated exclusively for the connection of that object.

Figure 13:
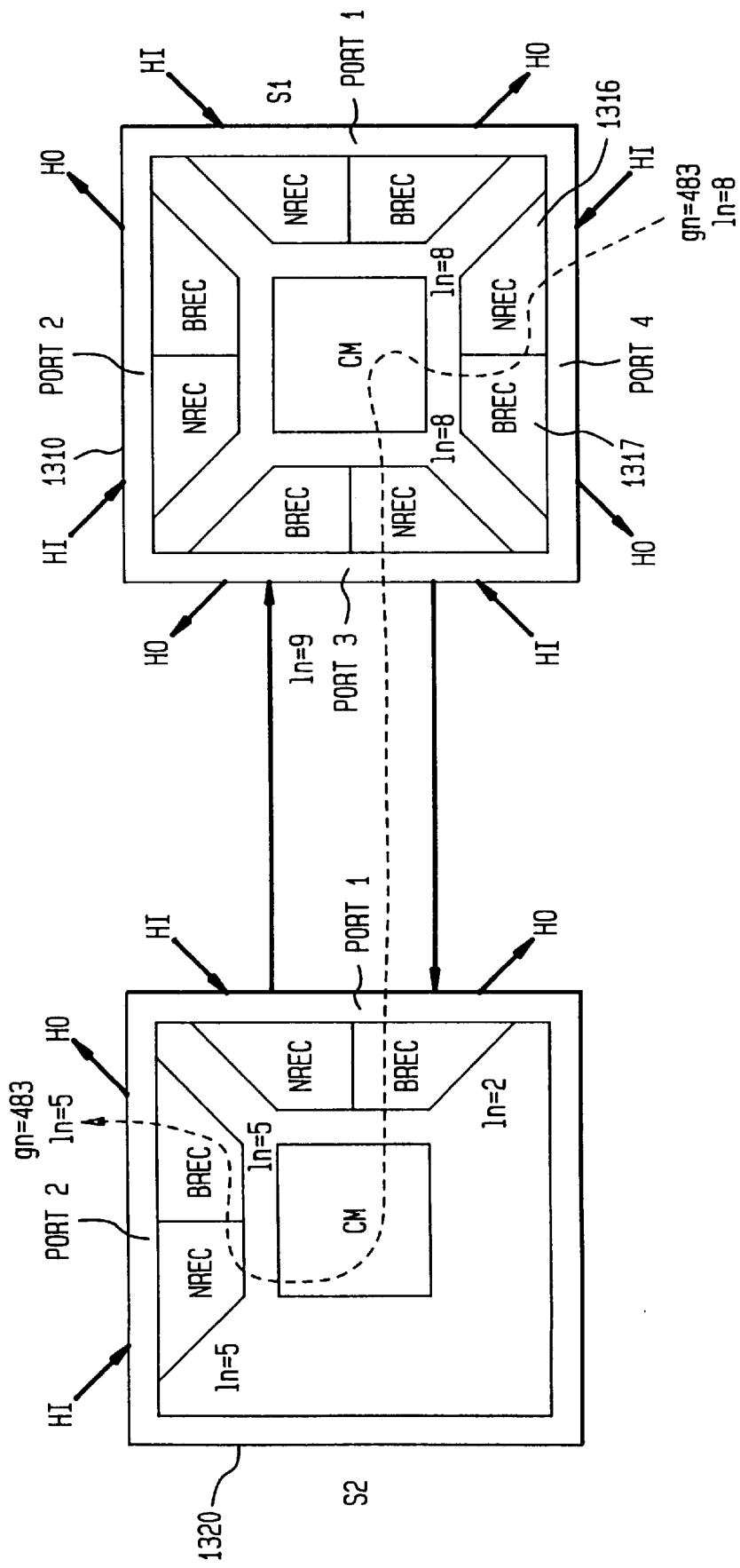
FIG. 13 depicts the correspondence between local and global names.

The distribution element uses local names for communication, private to each port (routing node), and the host at the periphery of the network. Each local name of the node corresponds to the unique global name. The one-to-one correspondence between local names of the neighboring nodes is established at the time of set-up of the spanning tree. At each port, the local name of the incoming data object is translated to the local name of that port, and that local name is used for accessing local state information and as the local name designator for the outgoing data transfers. The local name is denoted as the virtual circuit (VC), and those global names which have an active VC at the corresponding node, are said to be cached connections at that node. The correspondence between local names of neighboring nodes, and between local names and global names at the host is illustrated in FIG. 13. Global name 483, (gn=483), at the host attached to the port 4 of distribution element 1310 (S1), is mapped into the local name 8, (In=8) at that host. The same local name (ln=8) is used at both NREC 1316 and BREC 1317 at the port 4 of S1 to which that host is attached. The local name corresponding to the same object at port 3 of S1 is In=9. The next port on the spanning tree of the object gn=483 has local name In=2 (port 1 of distribution element 1320 (S2)), followed by In=5 at port 2 of S2 to which another host that shares gn=483 is attached. Note that global name-to-local name translation is needed only at the hosts.

The global name can denote an object of any size. The shared objects are denoted as signatures. A signature is partitioned into the fixed size frames that are atomically transferred through the distribution element. All the frames of the signature are transferred across the same network path, determined by the set up of the VCs, without loss and with the sequencing of frames preserved by the distribution elements. This facilitates execution of coherency protocol needed in order to keep all the copies of the shared object consistent.

2.) Distributed Memory Coherency

The shared global name space imposes a problem of memory coherency, since each local physical copy of shared object is updated by a separate process. It is up to the network distribution elements and communication protocol to keep local copies consistent with each other. The coherency scheme supported by the distribution element is now described in more detail than was earlier described.

There is a spanning tree corresponding to each VC, i.e., each cached connection of the global name. The subtree of the spanning tree, whose vertices are ports of the same distribution element, has a root and up to three leafs. The root is denoted as a captain, whereas leafs are denoted as guards. The port that is a root of the whole tree is denoted as a super captain. Every port in the network knows the topology of the subtree belonging to its own distribution element.

Data is transferred across the spanning tree of the VC within the synchronization cycles. The synchronization scheme implemented by a self-timed distributed democratic protocol supported directly by the distribution element.

Self-timing keeps all the nodes tuned into the particular VC in lock step. Each cycle has two phases: the write phase and the read phase. The synchronization protocol ensures that the read phase does not start in any node until all nodes have completed the write phase, and that no node starts the write phase until its read phase of the previous cycle is over. The synchronization protocol is described later in detail.

All hosts that are updating the signature during the current cycle propagate the signature's new value to the super captain in the write phase. This is called backward propagation. The data frames of one signature update comprise one "element", and each element is denoted by an element number within the frame header. All elements sent to the super captain within one cycle comprise the "lossless bag". It is called lossless since the distribution element guarantees that all data that is sent by the source will be received by the destinations. The super captain is the last one to reach the end of the write phase, and at that instant of time the super captain has received the whole bag, i.e., all updates from the current cycle, since there is no loss. The super captain initiates the read phase by transferring frames of the updated signature towards the receiving hosts in a forward propagate direction, after mediation has occurred in the super captain. At the end of the read phase all hosts have received values(s) of the signature updated in the current cycle. In every particular cycle every host decides whether it wants to read and/or write in next cycle, and that information is propagated throughout the network up to the super captain. This selectively process improves performance by eliminating unnecessary data propagation throughout the network.

This coherency scheme is flexible since it is controlled directly by the applications through the synchronization mechanisms. Multiple writers are directly supported by the above protocol. The single writer protocols can be implemented by allowing data transfers only to the super captain. The reorientation of the spanning tree is directly supported by the distribution element, requiring no additional transfers other than the ordinary synchronization instructions. This facilitates easy and efficient transfer of write access privileges in the single writer schemes, or ownership privileges in the multiple writer coherency schemes.

3.) Routing and Demand Based Multiplexing

Data is propagated through the network in the fixed size frames. The size of the frame in the current implementation is, e.g., 20 bytes, where 5 bytes are used for the header and 15 bytes are information payload. The data traffic corresponding to different VCs is frame size interleaved, i.e., transfer of each frame through the distribution element is atomic. The relatively small size of the frame provides the ability for fine grain bandwidth assignment, where transfer of small signatures will not be penalized by long ones.

The port of the distribution element that receives the frame from the network link or local host is denoted as the input port with the respect to the particular data transfer request. The port to which the frame is destined is called the output port. The routing function performs addressing of the destination output ports. The routing function is executed by the BREC-part of the input port of the distribution. The routing information is part of the VC state, which is accessed based on a local VC number of that port. The distribution element is thus self-routing, since it does not require any external controller for routing. The details of routing function are explained later.

The multiplexing establishes an actual path between the ports of the distribution element, in order to transfer data from the input port to the output port of the distribution element. The bandwidth of the output port is assigned on demand, rather than synchronously in fixed time slots (like in Time Division Multiplexing (TDM) scheme). This scheme avoids waste of the output port bandwidth, since it is assigned to the specific input port only when needed.

The multiplexing function is performed by the NREC-part of the output port. Since multiple requests for the same output port can be generated at one time, the requests have to be arbitrated by the NREC. In order to provide fair distribution of output port bandwidth to all requesting input ports, the priorities of input ports at the NREC arbiter are changed after each transfer cycle in order to ensure that every input has the same access privileges. The input port that is connected to the output port in the current transfer cycle has the lowest priority in the arbitration for the next transfer cycle, and the priorities of other inputs are shifted so that the second highest priority input from the current cycle becomes highest priority input in the next cycle. The following examples illustrate how this scheme works.

Assume that the NREC arbitrates four inputs and that the initial order of priorities is $i1$, $i2$, $i3$, $i4$, where $i1$ has highest and $i4$ is the lowest priority. If all inputs are generating requests, the order of priorities in 8 subsequent arbitration cycles is the following:

| c1 | c2 | c3 | c4 | c5 | c6 | c7 | c8 |
|----|----|----|----|----|----|----|----|
| i1 | i2 | i3 | i4 | i1 | i2 | i3 | i4 |
| i2 | i3 | i4 | i1 | i2 | i3 | i4 | i1 |
| i3 | i4 | i1 | i2 | i3 | i4 | i1 | i2 |
| i4 | i1 | i2 | i3 | i4 | i1 | i2 | i3 |

The topmost row shows the highest priority input in the corresponding cycle (c1 to c8). Every input gets the same share of the bandwidth, since within 8 subsequent cycles each input achieves the highest priority input twice.

If there are only three pending inputs, the situation is only slightly changed by deleting those columns from the above table where the input that is not generating requests has the lowest priority, since there is nothing for the input to contribute in the arbitration scheme. If, for example, $i3$ is the input which is not generating requests, and the remaining three inputs do, the order of priorities in 6 1s subsequent arbitration cycles is the following:

| c1 | c2 | c3 | c4 | c5 | c6 |
|----|----|----|----|----|----|
| i1 | i2 | i4 | i1 | i2 | i4 |
| i2 | i3 | i1 | i2 | i3 | i1 |
| i3 | i4 | i2 | i3 | i4 | i2 |
| i4 | i1 | i3 | i4 | i1 | i3 |

Again, it is seen that every input gets the same share of the bandwidth, since within 6 subsequent cycles each one has the highest priority input twice among pending ones. The same reasoning can be applied for two pending inputs, and, of course, the reasoning is trivial for one pending input.

Although the routing in the distribution element is based on the virtual circuit set-up path, packet switching can be easily implemented as a service. Packet switching requires modifications of the routing information in the packet header at each node. This can be implemented in the network of distribution elements by sending each packet received by a BREC to its local host, where routing information can be changed by special hardware or by the host, and then shipped back to the same BTU for further propagation.

4.) Multicasting

A multi-point connection pattern is directly supported through the multicast addressing scheme. The routing address at the BREC can specify any subset of output ports as the destination. The input port performs a transfer cycle only if the paths to all destinations are free. Only one atomic transfer cycle is executed by the BREC of an input port, regardless of the number of ports in its destination set. This addressing scheme improves performance by decreasing the number of messages sent in the multipoint (one to many) communication patterns as will be shown later.

A multicasting scheme requires careful implementation, since it may cause deadlock situations. The deadlock scenario and the solution for its avoidance are discussed later.

5.) Synchronization and Tree Reorientation

The sharing of objects requires the means for synchronization of access. If the degree of sharing is large and operations to shared objects are frequent, the synchronization operations are executed very often. If synchronization mechanisms in a distributed environment are strictly memory-based, the synchronization accesses would easily saturate the network. A simple example of a memory-based synchronization primitive is the so-called test-and-set instruction, which atomically tests and eventually changes the memory based flag. If the value of a flag denotes the free state, it is set to the value that denotes the busy state, and control of a shared object is taken. If the processes that share that object are placed on different processors, each processor has to access the flag and find it free before it can take control of a shared object. In a highly contentious situation, the processors may constantly try to access the flag, and the synchronization-related data transfers may take a lot of interconnection network bandwidth.

Thus, the interconnects itself should provide the means for synchronization that will reduce synchronization-related network traffic. The synchronization mechanism must be distributed and fair in order to achieve good performance and reliability.

Figure 14:
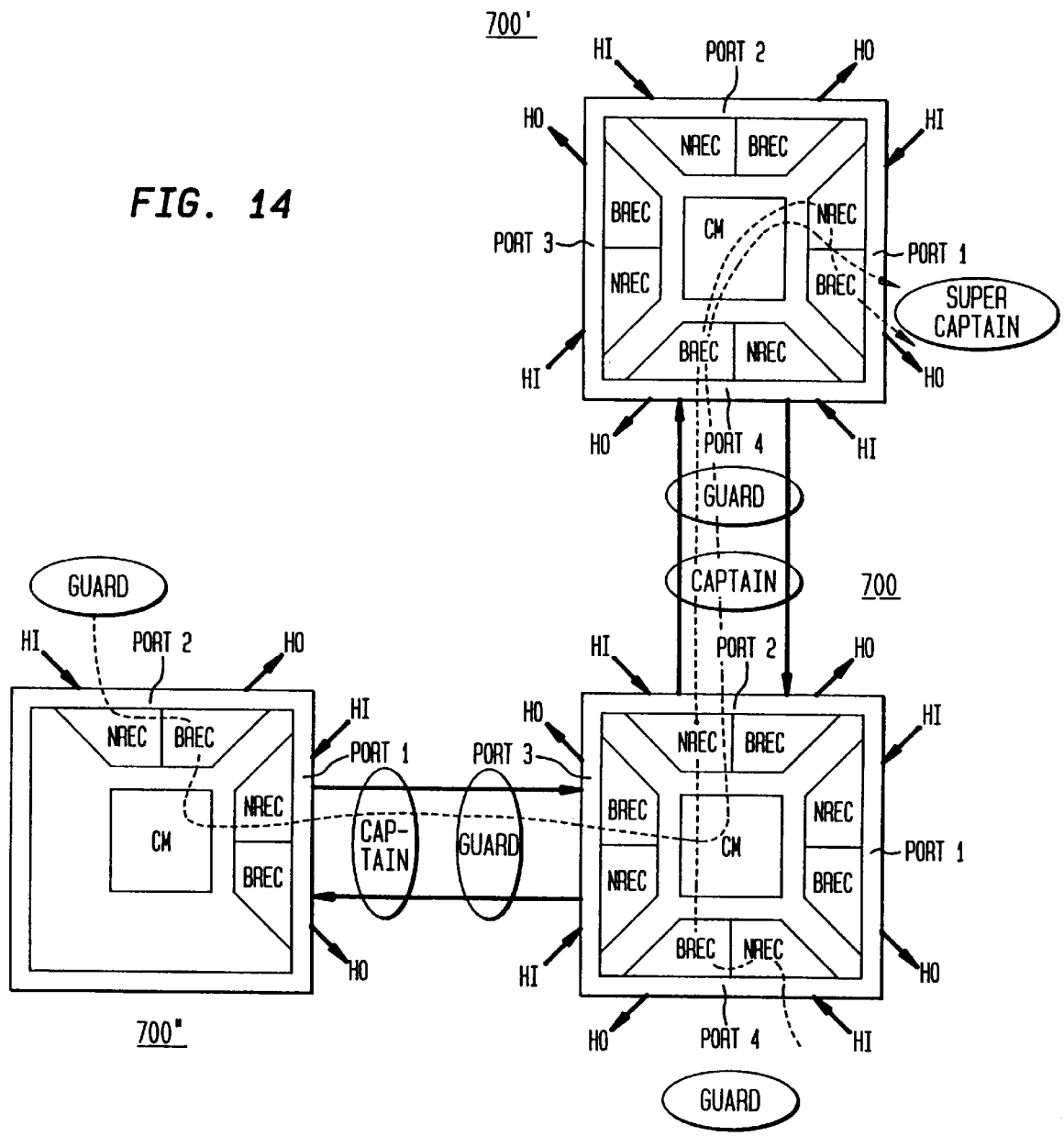
FIG. 14 depicts the labeling of distribution elements which determines the procedure by which data is routing among the distribution elements composing the system.

The synchronization protocol provided by the distribution element is the logical clock. The protocol keeps all nodes in lock step, so that the logical clock assigned to the nodes in the network does not differ by more than one in any instant of time. The synchronization algorithm for the nodes connected by the spanning tree is the following. The routing path of a VC is represented by its spanning tree. The children of every internal node are called guards, and its parent is the captain. The node at the root of the tree is the super captain. An example of network labeling is illustrated in FIG. 14. The sequence of messages sent in a synchronization protocol and their direction are set forth in FIG. 15 for reference during the following discussion. Also, the state diagram of VC with respect to the synchronization protocol is set forth in FIG. 16 for reference during the following discussion.

Figure 15:
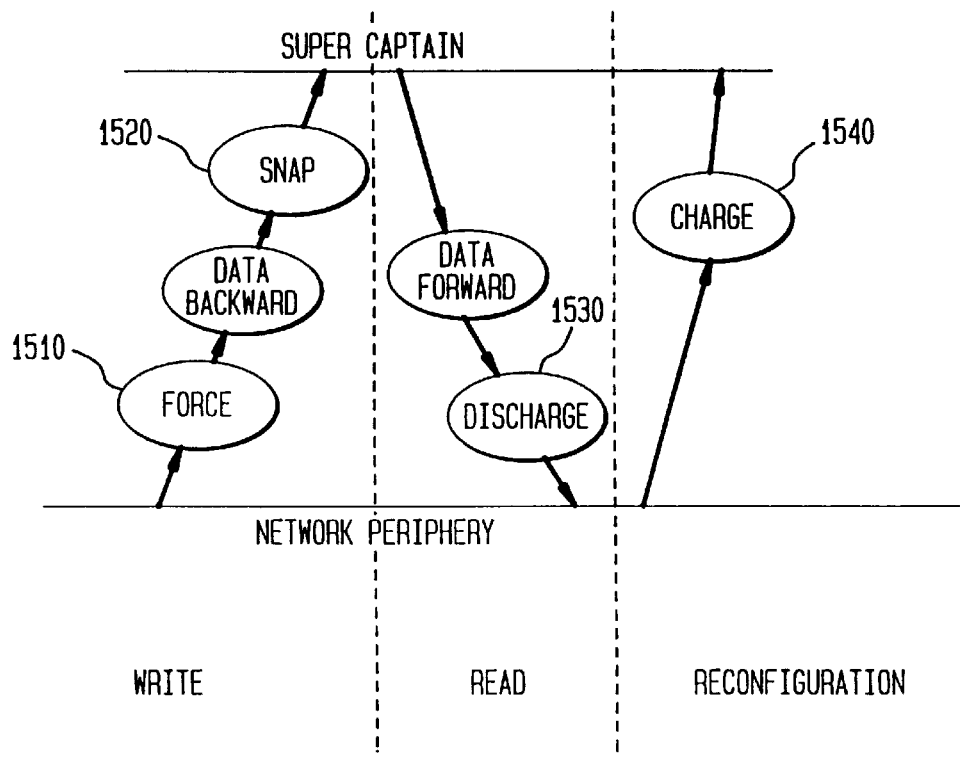
FIG. 15 shows the logical clock phases and messages.
Figure 16:
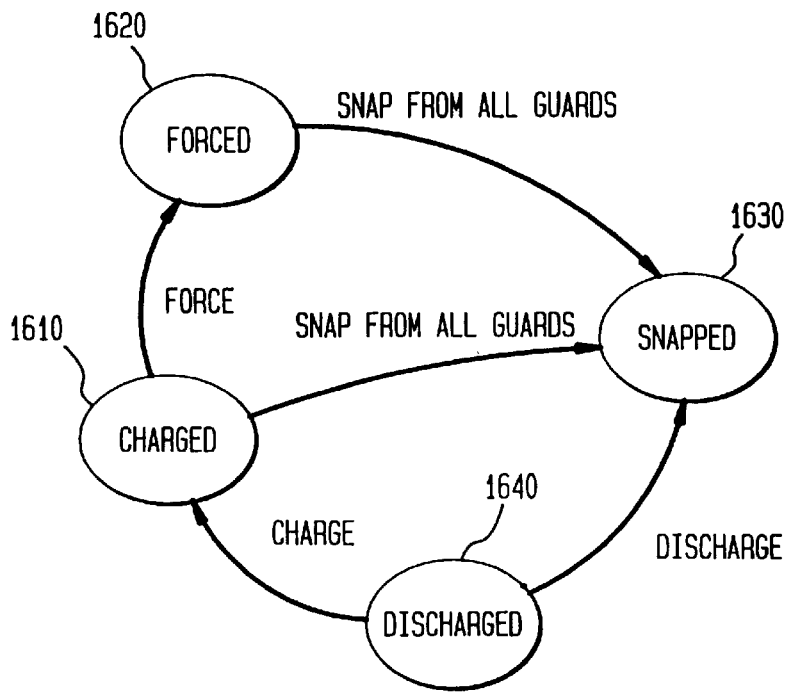
FIG. 16 shows the logical clock state diagram.

The synchronization instructions that are propagated throughout the network are charge, force, snap and discharge (reference numerals 1540, 1510, 1520, and 1530, respectively, in FIG. 15). The state of the VC in every node has component nodestate that describes the phase of the current VC's logical clock. This state has four values: charged, forced, snapped and discharged (reference numerals 1610, 1620, 1630, and 1640, respectively, in FIG. 16). Every clock state at every node can be in the inhibited or released state. In the inhibited state, the clock is not allowed to advance, whereas in the released state it may advance.

The nodestate field of the VC state at all nodes is initially charged. The node that wants to write data in a particular clock cycle sends aforce message towards the super captain, and changes its nodestate field to forced. All the nodes on the path towards the super captain that receive the force instruction change their nodestate VC state field intoforced. The data can be written (propagated in a backward direction, towards the super captain) only between aforce message and a snap message. The snap message is sent after all data frames have been sent, if the node wishes to write data in the particular cycle, and local clock state is released. The node that does not write data in the cycle sends a snap instruction towards the super captain as soon as the local clock is in the released state. Leaf nodes change their nodestate field into the snapped as soon as they issue a snap instruction. The inner network nodes change their nodestate to snapped when snap instructions are received from all its guards, and issue one snap instruction to its parent node on the spanning tree. Snap instructions are thus merged by the inner nodes so that every node issues one snap instruction during the cycle.

When the super captain is snapped it has received all data frames written during that clock cycle, since distribution elements provide lossless flow control and preserve sequencing of propagated data frames. This signifies the end of the write phase of the logical clock cycle.

The super captain sends data frames in a forward propagate direction, when it is in a snapped state. The data is sent in a multicast manner to all nodes that are tuned into the signature that is updated, and which during the previous cycle signaled the intention to read data in a current cycle. Once all data frames have been propagated, the super captain sends a discharge instruction towards the leafs and changes its nodestate VC field to discharged. The discharge message is sent in a multicast manner to all nodes tuned into the signature. Every node that receives a discharge message changes its nodestate component of the VC state into discharged. Once in a discharged state, the node has read all data updated in that cycle.

The leaf node that receives a discharge message immediately issues a charge message towards the super captain, and changes its nodestate into charged. The inner node that receives a charge message from all its guards changes the nodestate into charged and issues a charge message to the super captain. Charge instructions are merged in the same manner as snap instructions, so that each node issues only one charge instruction in a cycle. The charged value of the nodestate VC field denotes the initial phase of the next logical clock cycle.

Figure 17A:
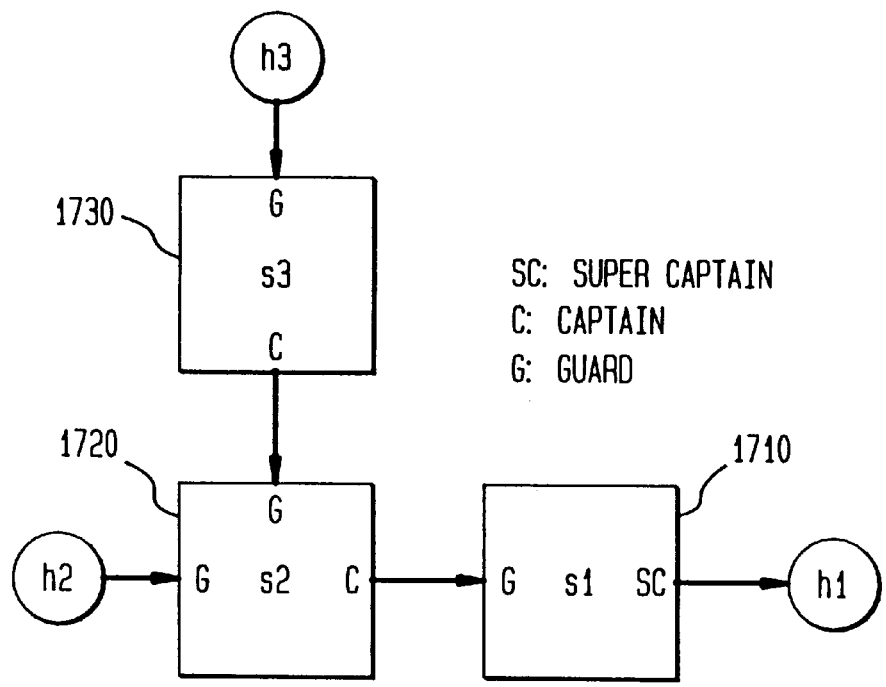
FIGS. 17a and 17b show a spanning tree before and after reorientation, respectively.
Figure 17B:
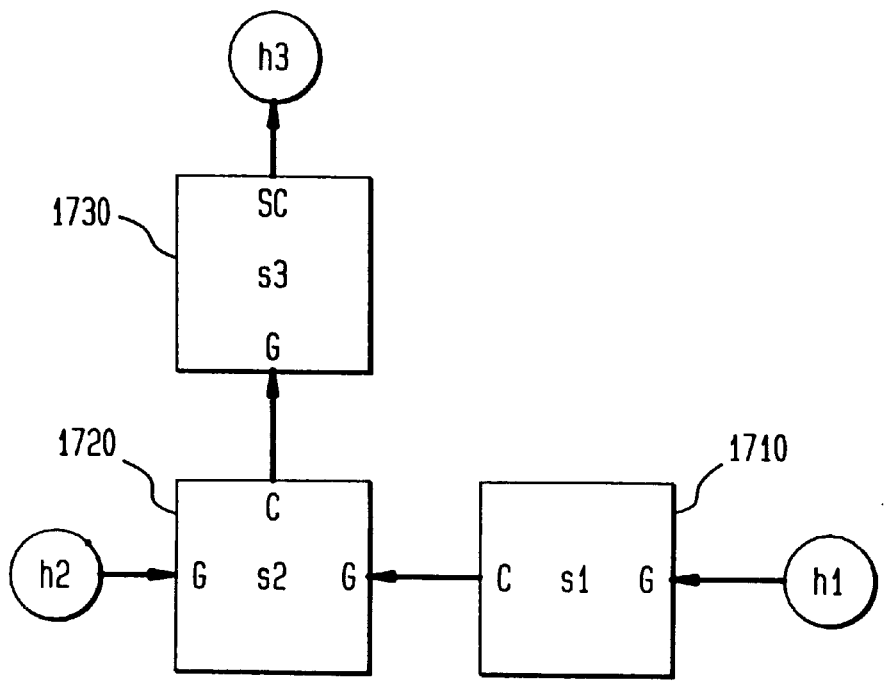

Every node in the network can request to become the super captain of the current cycle in order to change the orientation of the spanning tree. The request is sent with a snap message. If the super captain wants to give up its super captain privilege, it acknowledges the super captain request with a discharge message. The actual reconfiguration takes effect after the charge instruction, with the beginning of the next phase. If multiple nodes request a super captain license during the current cycle, only the first request that reaches the super captain is granted. One example tree, before and after the reorientation, is presented on FIGS. 17a and 17b. In FIG. 17a, the super captain is initially associated with distribution element 1710. As a result of a reorientation request, the super captain becomes associated with distribution element 1730. Distribution element 1720 must also change is allegiances as a result of the reorientation.

The implementation of tree reorientation procedure is explained later in the description of the distribution element instructions.

This synchronization protocol reduces the number of messages sent throughout the network, in comparison to conventional memory based synchronization primitives. During each synchronization cycle every synchronization message is sent by every node only once. The distribution element effectively reduces the number of messages by providing a means for merging of instructions in a backward direction and multicasting in a forward direction. The tree reorientation protocol provides a means for a change of signature ownership without any messages in addition to synchronization messages. Furthermore, besides synchronization, the logical clock provides a means for sequencing since some operations can be performed with respect to the particular clock cycle.

6.) Lossless Data Flow Control and Sequencing

Figure 18:
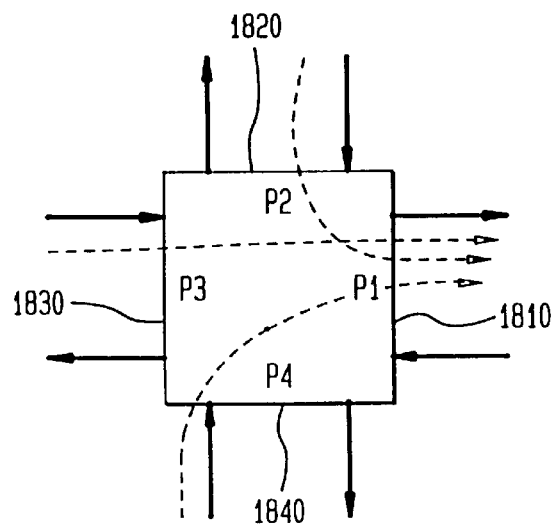
FIG. 18 illustrates a "bottleneck" condition at the output of a port of the distribution element.

Data congestion in the networks occurs when data traffic bandwidth demand exceeds available bandwidth. The bottleneck can occur at the periphery of the network, or at the network backbone. The bottleneck at the periphery occurs when a destination is not ready to receive data, and is very common in the high speed networks with the low speed peripheral interfaces. The bottleneck can also occur in the backbone of the switching network when the aggregate traffic bandwidth requirements exceed link capacity. An example of the bottleneck at the output port of the single distribution element is illustrated in FIG. 18. Input ports 2, 3, and 4 direct their data traffic, which comes at the rate equal to output port's bandwidth, to output port 1. Port P1 (reference numeral 1810) is a congestion point, and if input ports P2, P3, and P4 (reference numerals 1820, 1830, and 1840, respectively) continue to receive data destined for port P1 beyond its buffering capacity, the buffer of P1 will overflow and data will be lost. As discussed earlier, end-to-end signaling for bandwidth reservation, in order to avoid losses, cannot be implemented in gigabit network environment without high penalties in network utilization and data transfer latency time. The distribution element approach to lossless data flow control avoids end-to-end signaling and bandwidth reservation.

The objective is achieved by detecting congestion at the bottleneck when it occurs and by signaling the problem to the sources quickly so that the network is not saturated with the data that cannot be propagated. In order to avoid large signaling latency, congestion detection and signaling should be performed at the speed of data transfer and the signaling path should be minimal. A minimal signaling path is the one from the bottleneck back to the place where the last data frame which was pushed into the network by the source currently resides.

Figure 19:
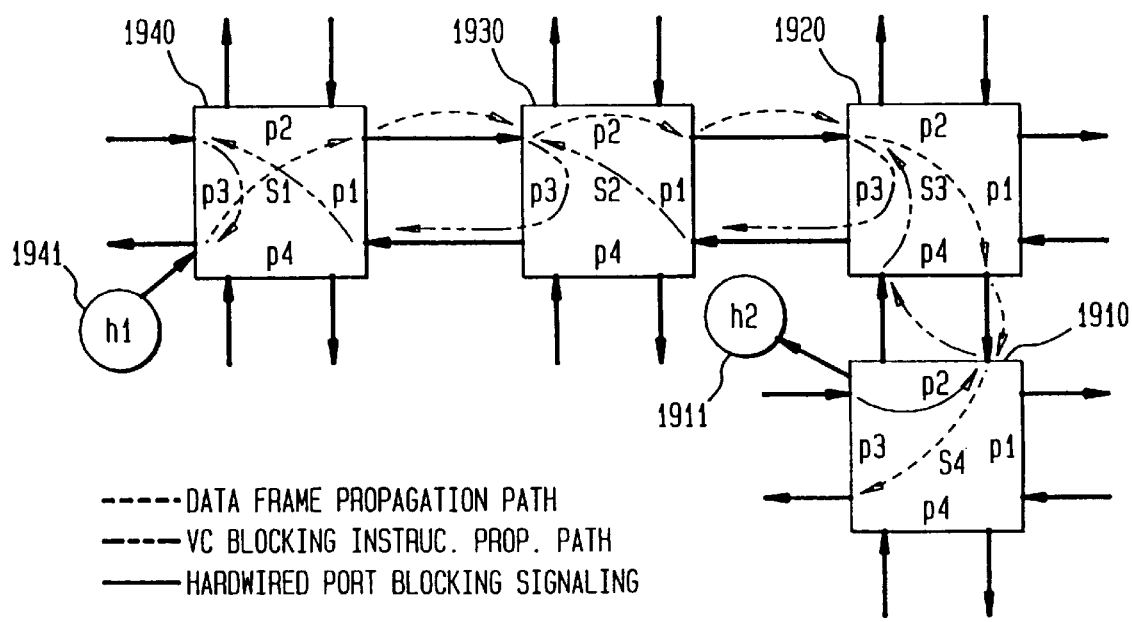
FIG. 19 illustrates back propagation of virtual circuit blocking.

Back propagation of VC blocking lossless data flow control supported by the distribution element is explained through the following example. The example network is illustrated FIG. 19 for discussion purposes.

Host 1941 (h1) attached to the portp3 of distribution element 1940 (s1_p3) is sending data to host 1911 (h2) attached to port p3 of distribution element 1910 (s4_p3). If h2 is not ready to receive data, it will signal this state by a blocking signal that is sensed by BREC of s4_p2, which is a source of data for h2 on distribution element s4. When the data frame arrives at BREC of s4_p2, it will not be propagated to the busy destination, but rather will be saved into the buffer at the BREC, called the loop-back buffer, which is used for buffering frames belonging to the blocked VC path. Before the frame that encountered blocking is passed to the loop-back buffer, a VC blocking command is sent back on the link between s4_p2 and s3_p4, towards s3_p4 which is immediately preceding source. In response to a VC blocking instruction, s3_p4 will generate a VC blocking instruction to s3_p3 that is its immediately preceding source. That will block the corresponding VC at the BREC of s3_p3. When the next data frame on that VC arrives at the BREC of s3_p3, and encounters a blocked VC, it will be stored at the loop-back buffer and a VC blocking instruction will be sent across the link between s3_p3 and s2_p1. That will block the VC at s2_p1, and generate a VC blocking instruction to s2_p3, which is its immediately preceding source. The VC at the s2_p3 will now be blocked. If there are no new data frames coming from the h1, the back propagation of VC blocking would stop here, and the frames that cannot be propagated will be left in the loop-back buffers of s4_p2 and s3_p3. If h1 is still sending data on that VC, the first frame that reaches BREC of s2_p3 will encounter a blocked VC, proceed to loop-back buffer of s2_p3, and cause generation of a VC blocking instruction towards s1_p1. The VC will be blocked at s1_p1, and a VC blocking instruction will be generated towards s1_p3, and h1 itself. That VC blocking instruction will force h1 to stop sending data frames across that VC.

The frames in the loop-back buffers in the input ports of the distribution elements 1910–1940 will try to reach destination outputs whenever the corresponding BREC is free for processing them. If the path is not free, the frames are pushed into the loop-back buffer again.

The VC unblocking procedure is performed in a similar manner. When h2 becomes ready to receive data, it will signal this condition by deactivating the blocking line, which is sensed by s4_p2. When the frame on the blocked VC comes from the loop-back buffer of s4_p2, it will encounter a free destination path and propagate to h2. When the last frame of that VC from the loop-back buffer is propagated, the VC unblocking instruction is sent from s4_p2 to s3_p4. The VC unblocking instruction will unblock VC at s3_p4, and generate VC unblocking instruction to s3_p3. This will unblock the VC at BREC of s3_p3. When the frame from the loop-back buffer of that port comes to its BREC for processing, the frame will encounter the unblocked VC and be propagated to its destination output port. The last frame of the loop-back buffer of s3_p1 belonging to that VC will generate VC unblocking instruction to s2_p1, and so on until h1 is reached or the last port on the backward path where that VC is blocked. The unblocking instruction at the host will resume data transfer from the point of interruption. The no loss requirement will be guaranteed with this procedure as long as loop-back buffer is large enough to accommodate all frames that could be pushed into the link on the blocked path.

The congestion can occur at the backbone of the network, not only at the periphery, as in the previous example. This will be detected by the accumulation of the frames at the link buffer of the BREC at the distribution input port that is sharing bandwidth of the output port in highly demanding traffic. When the link buffer is half-full, a port blocking instruction is generated towards the other end of the link that will block the output port that is pushing data into the link. The data frames that encounter this port block will cause the sequence of back propagation of VC blocking, in the same manner as the host port blocking did in the previous example.

When the frames from the link buffer are finally pushed towards their destination, and the link buffer is empty, the port unblocking instruction is generated towards the output port on the other end of the link, which will cause a sequence of VC unblocking instructions, in the same manner as the unblocking of host port did in the previous example.

The frames within a signature are numbered by a sequence number, which is the part of the frame header. The frame number of the last frame that is propagated forward is part of VC state information. When the frames of the unblocked VC from the loop-back buffer are processed, the order of the frames in the signature is restored by propagating a forward frame whose sequence number is next to the one previously propagated; otherwise the frame is returned to loopback buffer. This ensures that frames of the signature are received at its destination at the same order they were sent at the source.

7.) Distributed Scalable High Level Control

The scalability of control is achieved by providing a high level control interface structure such that the control processor can be anywhere in the network. With this capability it is possible to have one control processor for the whole network, or to have one control processor per BTU of the distribution element, or any number of control processors between these two extremes. The architectural features that provide this flexibility are described later in more detail.

Since all BTU operations are performed based on the content of VC state memory and port state memory, the high level control is achieved by a direct write into these memory spaces. The control instructions are authenticated so that only the control processor that has this authorization code can issue control instructions that will actually be accepted and executed by a BTU.

8.) Layered Functional Organization

The functions of each BTU are organized into the classes of three hierarchical levels called the L2, L1 and L0 levels, based on their complexity and the domain of their control. The execution units that perform each layer are also different, and their complexity grows with the hierarchical level of the instruction class they execute.

L2 level is highest hierarchical level, and it is responsible for initialization, setting up connections, and monitoring network. The L2 level is executed by a programmable processor that can be local or remote to a BTU.

L1 level instructions perform all operations that are related to cached VC. These operations have to be performed at the speed of data transfer in order to achieve maximal performance and efficiently use the bandwidth of the transfer media. These are executed by each BTU. With reference to FIG. 20, an input L1 level instruction (reference numeral 2010) operates on selected VC state information stored in VC state memory 2050, as provided to execution unit 2020 via multiplexer 2040, to generate a new value for the VC state that is then saved into VC state memory 2050; at the same time, a newly produced LI instruction (reference numeral 2030) is propagated further across the spanning tree path. The processing by circuitry 2000 can be viewed as a multiplexed memory-based set of state machines, where each cached VC correonds to one state machine and one state machine is executed during each L1 instruction cycle.

L0 level instructions perform actual data transfer between BTUs of each distribution element. These are executed by Crossbar Matrix 750 shown in FIG. 7.

The interface between L2 and L1 level is performed by special L1 instructions, which are described later. The interface between L1 and L0 level is performed through control signal interaction between each BTU and the Crossbar Matrix (CM) of the distribution element.

L2 Functions

These are high level instructions that are responsible for initialization and setting up connections between virtual names. The initialization sets a number of reserved VCs, called meta VCs, which are used for setting up other VCs. If the network is very large, multiple meta VCs can be used to cover the whole network by disjoint spanning trees. All other VC states in the VC state memory of a BTU are set to non-active in the initialization process.

Meta VCs are used for establishing connections for virtual names in order to avoid network flooding by multiple transmissions of a tune in request. The tune in request for a particular name is transferred across a meta VC, in the upward direction first (towards the super captain of spanning tree) and if the node that is tuned into the global name is not found on the way up, the tune in request is propagated down the spanning tree in broadcast fashion towards all nodes in the network. The tune in request is propagated to controllers of all BTUs that are traversed on its path through the network. The node(s) that are tuned in to the searched name can acknowledge the request to the super captain of the meta VC across which the search is satisfied, where eventual multiple acknowledges can be mediated and particular connection(s) chosen.

The implementation of L2 level by the programmable processors leaves a lot of flexibility in choosing methods for connection establishment. One of the possibilities is that multiple orthogonal (with the minimal set of common links) spanning trees can be established for the same global name, in order to provide redundancy for reliable transfers.

L1 Functions

These are instructions executed by any BTU in response to every frame received by it. They operate on the cached VCs and provide an interface to L2 level as well as performing data operations and flow control operations. This section describes the format and semantics of information fields processed by this class of instructions (frame format, VC status, port status), instruction execution process, and semantics of each individual instruction.

The following notation is used in the format description. Composite data structures are denoted by structure_name.field_name in its record-like representation, and structure_name(start_bit:end_bit) in its array like representation. The structures are defined by the following construct:

```
structure_name structure {
    field_name: structure_name(start_bit:end_bit); comment
    field_name: structure_name(start_bit:end_bit);
    .
    .
    .
}
Enumerated types are defined by:
    enumtype_name enumtype {
        name: decimal_equvalent; comment
        name: decimal_equvalent; comment
        .
        .
        .
    }
```

1.) Frame Format

There are two types of frames propagated throughout the network, namely, data frames and data flow control frames.

One data frame consists of 20 bytes. The first 5 bytes comprise a header, which is actually a L1 level instruction, and the remaining 15 bytes represent data load.

```
data_frame structure {
    header: data_frame(0:39);
    data_load: data_frame(40:159);
}
```

The format of the header is following:

```
header structure {
    opcode: header(0:4);         operation code
    frame_num: header(5:20);     frame number
    element_num: header(23:30);  element number
    vc_num: header(31:38);       VC number
    flag: header(39);            flag that distinguishes flow control
                                 from data frame instruction
}
```

The opcode field represents an operation code of a L1 instruction. It is defined with the above notation as:

```
opcode enumtype {
    nop: 0;
    start_fp: 1;      start forward propagate
    single_fp: 2;     one frame forward propagate
    cont_fp: 3;       continue forward propagate
    end_fp: 4;        end forward propagate
    start_bp: 5;      start backward propagate
    single_bp: 6;     one frame backward propagate
    con_bp: 7;        continue backward propagate
    end_bp: 8;        end backward propagate
    charge: 9;        charge logical clock
    force: 10;        force logical clock
    snap: 11;         snap logical clock
    discharge: 12;    discharge logical clock
    1st_req: 13;      link status request
    1st_ack: 14;      link status acknowledge
    cread: 15;        read by the control processor (CP)
    cwrite: 16;       masked write by the CP
    cp_req: 17;       CP request
    cp_grant: 18;     offer of CP
    L2_prop: 19;      instruction from CP to be propagated to neighbors
    L2_ins: 20;       L2 instruction to be propagated to CP
}
```

The frame number field sequences frames within the signature. It is used for re-sequencing frames propagated from loop-back buffers of a BREC, as explained earlier. It should be larger than the loop-back buffer capacity. Since frames are propagated on every network link in the sequence, due to the re-sequencing capability of the BREC, the total number of frames in the signature can be much larger, as long as frames are numbered sequentially.

Element number sequences differentiate sources of data in the lossless bag, i.e., the total number of writers to the signature in a cycle.

The VC number field is the virtual circuit number. This number is local to each BTU of the distribution element, and it is translated at each port of the network.

The format of data flow control frame is the following:

```
data_flow_frame structure {
    opcode: data_flow_frame(0:2);      operation code
    vc_num: data_flow_frame(3:10);     VC number
    flag: header(39);                  flag that distinguishes flow
                                       control from data frame
                                       instruction
    .
    .
    .
}
Operation code is defined by:
    opcode enumtype {
        blockfp: 0;        block forward propagate
        unblockfp: 1;      unblock forward propagate
        blockbp: 2;        block backward propagate
        unblockbp: 3;      unblock backward propagate
        block_port: 4;     block port
        unblock_port: 5;   unblock port
}
```

2.) VC Status Format

The format of virtual circuit status information at a BREC is defined by:

```
VC_status structure {
    error_flag: YC_status(0);
    lock: VC_status(1);
    active_fp: VC_status(2);
    active_bp: VC_status(3);
    blocked_fp: VC_status(4:6);
    blocked_bp: VC_status(7);
    loop_count: VC_status(8:23);
    phase: VC_status(24:31);
    license: VC_status(32);
    host_guards: VC_status(33:36);
    guards: VC_status(37:40);
    guards_charged: VC_status(41:44);
    guards_snapped: VC_status(45:48);
    fp_or: VC_status(49);
    fp_and: VC_status(50);
    bp_or: VC_status(51:54);
    bp_and: VC_status(55:58);
    read: VC_status(59:62);
    write: VC_status(63:66);
    read_work: VC_status(67:70);
    write_work: VC_status(71:74);
    nodestate: VC_status(75,76);
    captain_id: VC_status(77:79);
    super_cap: VC_status(80);
    local_sc_req: VC_status(81);
    chng_lic: VC_status(82);
    set_sc: VC_status(83);
    reset_sc: VC_status(84);
    chng_cap: VC_status(85:87);
    screq_id: VC_status(88:90);
}
```

The usage of VC status fields is following:

Error_flag is set when data frame is received in a wrong state. One example is a backward propagation frame received in a state where nodestate field does not have forced value. If this flag is set data are not propagated on that VC until control processor clears it.

Lock field is set by control processor in order to freeze state of VC and prevent data propagation across it. When this flag is set all incoming frames are sent to loop-back buffer, and data flow blocking instructions are generated towards data source, as if VC is blocked.

Active_fp filed is set for the time signature transfer in forward propagate direction is in progress.

Active_bp field is set for the time signature transfer in backward propagate direction is in progress.

Blocked_fp field is a counter that indicates how many destinations block traffic in a forward propagate direction. When it is zero, forward propagation is not blocked. Its maximum value is 7, since there can be up to seven destinations from captain port of the distribution element: 3 local hosts and up to 4 links of the distribution element if port is super captain, and 4 hosts and 3 links if port is not super captain. Whenever blockfp data flow control instruction is received this counter is incremented, and whenever unblockfp data flow control instruction is received it is decrement.

Blocked_bp is the flag that indicates that backward propagate traffic is blocked. It is set by the blockbp instruction and cleared by the unblockbp instruction.

Loop_count indicates number of frames of VC in the loop-back buffer. It is incremented whenever frame is inserted in the loop-back buffer for the first time. It is decremented when the frame from loop-back buffer is propagated towards its destination(s). If the frame that is processed is received from the loop-back buffer, and returned to the loop-back buffer loop_count field is not changed. When this number changes from 0 to 1, i.e., when the first frame is inserted into the loop-back buffer upon detection of blocked VC or blocked destination port, data flow blocking control instruction is generated towards other and of the link, in order to stop data transfer on VC. When it changes from 1 to 0, i.e., when the last frame is propagated across previously blocked path, data flow unblocking control instruction is generated towards other end of the link in order to resume data transfer.

Phase field indicates cycle number of logical clock. It is incremented in modulo arithmetic at the end of logical clock cycle. It can provide useful information to L2 level for monitoring, performance measurements and high level control.

License field indicates whether BTU is root of the VCs spanning sub tree on the distribution element (captain), or leaf (guard).

Host_guards field is a four bit vector that denotes which of the four hosts that can be attached directly to the distribution element are tuned into VC. Bit 1 corresponds to host attached to its own port, bit 2 is for the host attached to the port on the left hand side, bit 3 is for the host attached to the port on the opposite side, and bit 4 is for the host attached to the port on the right hand side. This field is used for routing and detection of blocked ports.

Guards field is a four bit vector that denotes which of the four ports are on the VCs spanning tree. With reference to FIG. 21, bit 1 (reference numeral 2110) corresponds to its own port and it is set only if the link attached to this port is on the spanning tree. Bit 2 (reference numeral 2120) is for the port on left hand side, bit 3 (reference numeral 2130) is for the port on the opposite side, and bit 4 (reference numeral 2140) is for the port on the right hand side. This field is used for routing and detection of blocked ports.

Guards_charged is a 4 bit vector field that indicates from which guards charge instruction has been received. If it has been received from all guards, the charge instruction will be generated and propagated towards super captain.

Guards_snapped is a 4 bit vector field that indicates from which guards snap instruction has been received. If it has been received from all guards, the snap instruction will be generated and propagated towards super captain.

Fp_or, fp_and bits are set by the discharge instruction if it is specified by its data field. Fp_or is propagated only to one arbitrary chosen destination, and fp_and status is propagated to all destinations. This is used by applications for explicit choice of one arbitrary destination or all destinations, respectively.

Bp_or, and bp_and fields are four bit vectors which are set explicitly by snap instruction. Bp_or bit is propagated further with snap instructions if any of the bits in the field where set, and bp_and is propagated further with snap instruction if all the guards have set corresponding bits in snap instruction. This mechanism can be used by applications for explicit "or" and "and" network wide logical operations.

Read and write fields are four bit vectors which denote which of the guards wants to read data, and write data, correspondingly, in the current cycle. Only if the read bit for a particular guard is set, captain will propagate data in a forward direction to it. This mechanism provides hosts with ability to selectively read data with respect to logical clock cycle, and reduce network loading by eliminating unnecessary data transfers. Data will be accepted in a write phase only from those guards that have corresponding write bit set. Since this field is propagated by snap instruction, super captain knows from how many guards to expect data in the write phase of the cycle.

Read_work, and write_work are working copies of the read and write fields, which are changed by the snap instructions of current cycle. With the execution of the charge instruction they are copied into the read and wnte fields and become active copies for the next cycle.

Nodestate is field that represents phase of the logical clock. It can have one of the four values: charged, forced, snapped, and discharged. Its use is described previously in the description of logical clock algorithm.

Captain_id is the field that denotes relative position of the current captain. If it is 1, current captain is host attached to its own port. If it is 2, captain is its the left neighboring port, if it is 3, captain is port on the opposite side of the distribution element, and if it is 4 captain is its the right neighboring port. It is used for routing and port blocking detection in backward propagate direction.

Super_cap is the field that denotes if super captain host is attached to its own distribution element. If license field is captain, then super captain host is attached to its own port, and if license field is guard then super captain host is attached to the port denoted by captain_id field. This field is used for routing and port blocking detection in backward propagate direction.

Local_sc_req is the field that denotes if request for super captain license in current cycle is issued from one of the hosts attached to its own distribution element. This bit is used in the tree reorientation procedure.

Chng_lic is the field that denotes that the value of license field should be changed at the end of the current cycle, as the result of the tree reorientation procedure. If the current value of license field is captain, the new will be guard, and vice versa.

Set_sc, and reset_sc fields denote that value of super_cap fields should be set or reset, respectively, at the end of the current logical clock cycle. This bit is used in the tree reorientation procedure.

Chng_cap field is the new value for captain_id field that should be set at the and of the current cycle. This bit is used in the tree reorientation procedure.

Screq_id is the relative position of neighboring port from which request for super captain license arrived in the cycle. This field is used only by port that has captain license, since only captain port could receive super captain license request. If this field is different from zero, it means that one super captain request is already propagated during current cycle, and all subsequent super captain requests will be ignored. Thus, it serves both to identify super captain (SC) request source and to filter requests, so that the SC host receives only one request in the cycle.

The format of virtual circuit status information at a NREC is defined by:

```
VC_status structure {
    chng_lic: VC_status(0);
    set_sc: VC_status(1);
    reset_sc: VC_status(2);
    license: VC_status(3);
    super_cap: VC_status(4);
    local_host_guard: VC_status(5);
    local_host_only: VC_status(6);
}
```

The first 5 fields have the same semantics as the fields with the same name at BREC VC state. Field local_host_guard denotes whether the local host is tuned into the VC. Local_host_only denotes whether the port on the other end of the link is tuned into the VC. These fields are used for routing by the NREC receiver.

3.) Port Status

Each BTU has the following global state information:

Btu_status is the two bit field that denotes whether BTU has Control Processor (CP) assigned to it or not. It is reset to (0,0) at reset, and after reset it is changed to (0,1), what effectively presents CP pending request. When BREC is available for execution it will accept that request and generate request for CP by cp_req instruction. Once cp_req instruction is issued status changes to (1,0) to denote that BTU is waiting for CP grant. When BREC receives cp_grant instruction that grants CP to its BTU, btu_status is changed to (1,1). If during the operation BTU gets indication that its CP is cut off, btu_status changes back to (0,1) what will effectively generate new cp_req instruction.

Link_status is the two bit field that denotes whether link attached to the port is alive, i.e., has ready BTU on the other end, or not. It is reset to (0,0) at reset, and after reset it is changed to (0,1), what effectively presents link status pending request. When BREC is available for execution it will accept that request and generate request for link status by lst_req instruction. Once lst_req instruction is issued status changes to (1,0) to denote that BTU is waiting for acknowledge of link status from the other end. When BREC receives lst_ack instruction that denotes that there is ready BTU at other end of the link, link_status is changed to (1,1). This instruction is used for BTU initialization during live insertion into the network.

Link_error is one bit field that denotes that error occurred during data transmission across network link attached to its port.

Cp_assigned is 3 bit field that denotes relative position of its control processor. If it is 0, CP is not assigned, value 1 denotes that CP is local host attached to its port, value 2 denotes that path towards CP is across its left neighbor port, value 3 denotes that path towards CP is across port on its opposite side, value 4 denotes that path towards CP is across its right neighbor port, and value 5 denotes that path towards CP is across port on the other and of its link. This field is used for routing towards CP, and for detecting that path towards CP is cut off.

Lock_port_in, and lock_port_out are the status signals for locking the input, and output side of the port. When lock_port_out signal is active, port is blocked so that it can not generate any data into the link attached to it. If lock_port_in status is active and the output side of the port on the other end of the link is not blocked, port blocking data flow control instruction is generated towards the port on the other end of the link, in order to block it. These status bits are changed by cwrite (control write instruction) that is issued by BTU's control processor.

4.) Instruction Execution Phases

Each instruction is executed by both the BREC and the NREC. The execution at a BREC involves the following phases:

a) Local name translation. Since VC number is local for each port of the distribution element, the incoming VC is translated into its own VC through the translation memory. The translation is not performed if source of the data frame instruction is NREC from the same port, since VC is common for both NREC and BREC of the same port.

b) Blocking detection and signaling. Before propagating data frame towards its destination(s) selected by routing information, it is checked whether destination ports are blocked, or VC itself is blocked. If either one is true, and blocking message is not already sent to the previous port on the data path, VC blocking data flow control instruction is issued and sent to the port on the other end of the link. If the previously blocked VC is unblocked and destination ports are not blocked, the VC unblocking data flow control instruction is issued and sent to the port on the other end of the link, if it is not already done.

c) Instruction execution. The operations that are to be performed are specified by operation code within data frame header. As the result, the new value of VC state, and data frame is computed. The semantics of each L1 instruction is described later.

d) VC and port state update and frame propagation. The effect of instruction execution is stored into the state memory, and the data frame propagated towards its destinations. If destination port(s) are blocked or VC is blocked, data frame is propagated towards loop-back buffer.

The execution at a NREC involves all the phases as in BREC, except phase b), since if data frame is in NREC it is dedicated for propagation towards its destination(s). If the path to destinations is blocked it would have been detected by BREC and frame would not even reach NREC. If blocking occurred during the transfer between BREC and NREC, destination path has enough buffers to accommodate this frame. VC number is also not translated if data frame source is BREC of the same port or local host attached to its port, because their local name space is the same as that of NREC.

5.) L1 Instruction Set

There are two L1 instruction classes: data transfer instructions and data flow control instructions. Data transfer instructions are used for data propagation, synchronization and interface to the control processor. These are long frame instructions whose format is defined by data_frame structure. Data flow control instructions are used for lossless congestion control. These are short frame instructions that have higher priority than the first class of instructions in contention for all shared paths. These instructions have highest priority since they are used to pass a congestion signal from a bottleneck point to the source of data, and the faster they are processed the less data is pushed into the congested network path.

This section describes the function of each instruction in both classes, their purpose and the effect.

Data transfer instructions are divided in the following classes: data propagation, synchronization, initialization and control processor interface instructions.

a.) Data on instructions

Start_fp instruction denotes the first frame of the forward propagate signature. Forward propagate direction is down the tree, i.e., from the super captain to the hosts at the leafs of the VC spanning tree. The frame is propagated in a multicast way at every distribution element on its path. The active_fp field of VC status is set.

Cont_fp denotes any forward propagate frame that is between the first and the last frame of the signature. It is propagated in the same manner as start_fp frame, but it has no effect on active_fp VC status field.

End_fp denotes the last frame of the signature. It is propagated in the same manner as start_fp, and cont_fp frame, and it clears active_fp VC status field. All frames of the multiple frame signature (start_fp, followed by a sequence of cont_fp frames and ended by end_fp) are propagated from source to all destinations without loss and in the same sequence as they were sent from the source.

Single_fp is propagated on the forward propagate path, but it is not sequenced with reset to any other frame, and has no effect on active_fp status field. It is used for short data transfers.

Start_bp instruction denotes the first frame of the backward propagate signature. Backward propagate direction is up the tree, i.e., from the hosts at the leafs of VC spanning tree to the super captain. The active_bp field of VC status is set. Multiple writers (up to 256) can propagate at the same cycle each one contributing separate element to the backward propagate lossless bag.

Cont_bp denotes any backward propagate frame that is between the first and the last frame of the signature. It is propagated in the same manner as start_bp frame, but it has no effect on active_bp VC status field.

End_bp denotes the last frame of the element. It is propagated in the same manner as start_bp, and cont_bp frame. This frame is not originated by the source, but by the BTU of the distribution elements on the network path. In order to understand this we should have in mind that backward propagate frames of the same VC of multiple elements (from different sources) are merged at the backward propagate path. Each element is ended with a snap instruction by the source, and BTUs on the backward propagate path will convert this instruction into the end_bp instruction if it is not last frame of last element propagated by it, i.e., if all elements in its sub tree have not propagated snap instruction. Super captain will receive only one snap instruction at the end of the whole signature and end_bp at the end of each element, except last one that is ended by snap instruction.

All frames of the multiple frame element are propagated from source to the super captain without loss and in the same sequence as they were sent from the source.

Single_bp is propagated on the backward propagate path, but it is not sequenced with respect to any other frame, and has no effect on active_bp status field. It is used for short data transfers.

Syncronization Instructions

Force instruction is sent from hosts at the leafs of the VC spanning tree to the super captain. It indicates to the super captain writer's intention to send multiple frame signature, and is thus send as the first frame in the sequenced element. It changes the value of nodestate VC state field from charged to forced.

Snap instruction is sent from hosts at the leafs of the VC spanning tree to the super captain. The sender indicates to the super captain that it has completed the work related to the VC for that cycle. If the host was writer of the signature in the cycle, snap frame is sent as the last frame of the signature write. The BTU node that receives snap frame will propagate it further towards the super captain if it has already received snap instructions from its other guards, and change nodestate field of VC status into the snapped. Otherwise, it will convert snap frame into end_bp frame if it was preceded by cont_bp frames, or discard it if it is not part of multiple frame signature. Snap instruction received by super captain denotes the end of the write phase of the cycle. Snap frame carries with it "or", "and", "write" and "read" bits that are used for update of bp_or, bp_and, write_work and read_work fields in the VC status, respectively. It also carries request for super captain license. Only the first super captain license request that arrives at any BTU with snap instruction will be processed, and all other requests discarded. The tree reorientation (processing of super captain request) is performed by snap and discharge instructions, and reorientation takes effect after the subsequent charge instructions. The final effect is reorientation of the tree, including reorientation of write and read VC status field vectors.

Discharge instruction is sent from the super captain to the hosts at the leafs of the VC spanning tree. It is sent after all data has been propagated in the forward propagate direction, marking the end of the read phase of a logical clock cycle. The "or" and "and" bits are also sent with this instruction, and they update fp_or, and fp_and fields of VC status respectively. If "or" bit is set it is propagated across only one arbitrary selected forward path, and "and" bit is propagated to all hosts tuned into the VC. The super captain license acknowledge information is also carried with discharge instruction. If screq_id field of VC_status on captain BTU is greater then zero, what means that it is on super captain request path, the acknowledge of super captain is propagated with discharge instruction together with screq_id filed, so that other nodes of the distribution element can detect if acknowledge pertains to them or not.

Charge instruction is sent from hosts at the leafs of the VC spanning tree to the super captain. The BTU node that receives charge frame will propagate it further towards the super captain if it has already received charge instructions from its other guards, and change nodestate field of VC status into the charged marking the end of the current cycle. If tree reconfiguration was performed during the cycle, it takes effect at that point.

Initialization Instructions

Cp_req instruction is the request for control processor generated by BTU that does not have CP assigned to it. The source BTU determines routing of cp_req instruction based on the status of host interface at its own port, and the status of neighboring BTUs. If the local controller host is present at its own port, the cp_req instruction is sent to it. If not, it is sent to one of the neighboring BTUs, which will route it to its own CP. If neither local host nor neighboring BTUs are ready to receive cp_req instruction, it is sent to the remote BTU on the other end of the network link, which will pass it to its own CP. The BTU that generates cp_req inserts its own BTU unique identification number into the data field of instruction, so that control processor knows to whom to offer its control service.

Cp_grant is acknowledgment of control processor issued by the controlling host. The CP may be local to the BTU that is controlled, or remote one. If it is remote, the VC path to the controlled BTU must first be set before propagating cp_grant instruction. The cp_grant carries identification number for the BTU that is to be controlled, and only BTU that matches this number will accept cp_grant instruction as the assignment of CP.

Lst_req is the request of status of the link. It is sent to the BTU on the other end of the link in order to determine if it is active or not.

Lst_ack is sent by the active BTU as the response to lst_req instruction. BTU that receives this instruction, sets link_status field to the value that denotes that the link is active.

Control Processor Interface Instructions

Cread instruction is control read instruction that is issued by CP to the BTU controlled by it. Its purpose is to read state of BTU. The data field of instruction selects BREC or NREC state for reading, and the information to be read. The complete port state, or VC state of one selected VC can be read with one instruction, or only one VC field can be selected for reading. The content of local name translation memory can also be read. In addition, input side and output side of the port can be locked with cread instruction, which actually blocks all traffic across the port. Also, VC state can be locked, what has the effect of blocking data traffic across that VC in both forward and backward direction. This provides the ability to freeze the state information that is read till CP gets it and makes desired action. The access rights of cread instruction are checked by authentication code, and only if the check is successful cread operation proceeds. In response to cread instruction, BTU loads desired information into the data field of instruction's frame and sends instruction back to CP.

Cwrite instruction is control write instruction issued by BTU's control processor. The selection rules and authentication checks are the same as for the cread instruction. Both port state and particular VC state can be selected simultaneously for atomic write. Also, port state, translation memory or particular VC field can be selected individually.

L2_prop is instruction that is coming from L2 level, i.e., from BTU's control processor, in order to be propagated to BTUs neighbors. The data field of the instruction specifies to which neighbors to rout it, and what instruction to send. Thus, when the BTU that received L2_prop instruction from its CP propagates it further it changes its opcode to the one specified in the data field of incoming instruction.

L2_ins is the instruction that is to be routed to the BTU's control processor. The last two instructions provide means for communication through the network using L2 level, even though no cached VC is provided.

b.) Data flow control instructions

Blockfp blocks forward data frames propagation on a particular VC.

Unblockfp unblocks forward data frames propagation on a particular VC.

Blockbp blocks backward data frames propagation on a particular VC.

Unblockbp unblocks backward data frames propagation on a particular VC.

Block_port blocks data frames propagation from the output port of the distribution element.

Unblock_port unblocks data frames propagation from the output port of the distribution element.

L0 Functions

This level provides control of data transfer between the ports of the distribution element. It is executed by the Crossbar Matrix.

The multicast transfers by a BTU are supported directly by providing its BREC with the ability to address up to five units simultaneously and transfer data to all of them in a single cycle. The five units that can be addressed by the BREC, with reference to FIG. 22, are local host 2210 attached to the BTU, the output side of the BTU's own port (NREC 2220) and three other NREC ports 2230, 2240, and 2250 of the same distribution element.

The Crossbar Matrix has a cross-point for every input-output pair, so that four input-output transfers can take place concurrently, as long as requests from input ports to output ports are non-conflicting. The cross-points are active entities which completely decouple input and output ports by latching the whole frame and having independent control logic for communication with each input port and each output port.

The need for active decoupling of the cross-points arises because of the possibility of deadlock in the multicast transfers if the inputs were directly connected to outputs in a multicast transfer. The following example demonstrates the possibility of deadlock in that case.

Figure 23:
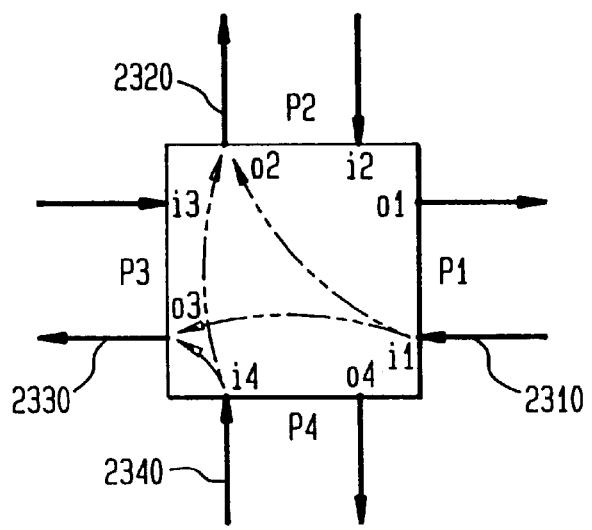
FIG. 23 illustrates a deadlock situation in a multicast transfer.

With reference to FIG. 23, suppose that input port 2310 (i1) of the distribution element addresses output ports 2320 and 2330, respectively (o2 and o3) for the multicast transfer, and that input 2340 (i4) is addressing the same output ports also for the multicast transfer at the same time. Both output ports will receive requests from inputs i1 and i4 at the same time and arbitrate them. Suppose that i1 wins the arbitration at port o2 and i4 wins the arbitration at port o3. Then port i1 will wait for port o3 to become free in order to finish the atomic multicast transfer, and port i4 will wait for port o2 to become free in order to finish its multicast transfer. So, i1 will hold o2 until i4 releases o3, and i4 will hold o3 until i1 releases o2, which is a deadlock situation.

The active latched cross-points solve this problem in the following way. Port i1 will transfer data to latches at cross-points i1-o2 and i1-o3, when they are both free, atomically and finish port i1's transfer cycle, and so will port i4 by transferring data to latches at cross-points i4-o2 and i4-o3. The active cross-point will generate requests to the output port to which it is dedicated, and independently of other cross-points. So, if i1-o2 wins the arbitration at o2, and i4-o3 wins the arbitration at o3, these transfers will be performed first, while data in cross-points i1-o3 and i4-o2 have to wait for the next cycle to complete the transfer.

The key is that the arbitration scheme at the output ports is fair so that data that is written into the cross-point latch will be guaranteed to propagate in a certain number of output transfer cycles, rather then waiting unpredictably long because of the requests from higher priority inputs. The arbitration scheme described previously guarantees that every input becomes the highest priority input in the worst case after (NI−1) output transfer cycles, where NI is number of inputs that can compete for the output.

The cross-points differentiate data frame transfer cycles from the data flow control frame transfers, which have higher priority than the first. The two transfer types are controlled with a different set of control lines, so that the arbiters at the output ports can differentiate them. The control frame transfer request has always higher priority at the output port than the data frame request from any input, but control frame transfer requests from different inputs are also arbitrated by the fair arbitration scheme. Thus arbiters at the output ports partition input requests into two priority classes, where arbitration within each class is fair. There is no danger that data frames will be blocked by higher priority control transfers, since these are infrequent.

High Level Design

The distribution elements are devices whose function is not independent of the environment, but is rather defined with respect to their environment. It is repeatedly stressed in the introductory section that network wide dependency of distribution elements is the main reason for their complexity and complexity of communication protocols. The approach of the subject matter of the present invention in reducing system complexity is in limiting functional dependency to the local neighborhood of each distribution element, as it was explained in the architecture section, but even with the limited dependency domain it is necessary to deal with all complexities inherent in distributed systems.

In order to successfully handle the complexity and test its network wide behavior, the hierarchical top-down design approach was selected for the distribution element. The VHDL language was selected for specification and prototype design. VHDL stands for VHSIC (Very High Speed Integrated Circuit) Hardware Description Language, and it is becoming standard language in microelectronics community. It has all the characteristics of high-level procedural languages for structured programming, and constructs that support different levels of hardware abstraction and design.

1.) VHDL Description

VHDL is a high level programming language with the support for object-oriented structured programming. Its wide range of descriptive capabilities and its acceptance as a standard makes it suitable for specification and design of complex systems. It supports hardware design by its ability to describe concurrence inherent in physical systems, and structural as well as behavioral hierarchical specification.

Concurrence is supported by the notion of processes and concurrent statement, as atomic execution units. Both constructs are used for behavioral description. A process is a sequence of statements executed in the same order they are in the source program, one after the other, but the execution of the whole process corresponds to one time unit in which the process is activated. Any number of processes and concurrent statements can be active at a time. The activation of process or concurrent statement is performed by the change of any signal in its activation list.

The basic design unit is an entity that describes the outside interface of the object. The interface is described by the ports of the entity. The entities can be interconnected in a more complex entity by connecting their ports by signals. The behavior of the entity is described by its underlying architecture. The architecture can have behavioral or structural representation. Behavioral representation is a set of processes and concurrent statements that describe the relation between input and output signals of the entity's ports and internal signals. Structural representation is the interconnection of lower level entities, which have their own underlying architecture of either structural or behavioral representation. There can be any number of hierarchical levels of decomposition, where the bottom-most level is the behavioral description.

The structural level VHDL design of the distribution element corresponds to the first functional decomposition of design. All the building blocks in the high-level VHDL description are the building blocks in the actual hardware design, where their VHDL behavioral description is replaced with the schematic representation of interconnected digital integrated circuits.

2.) High Level Block Structure of the Distribution Element

Figure 24:
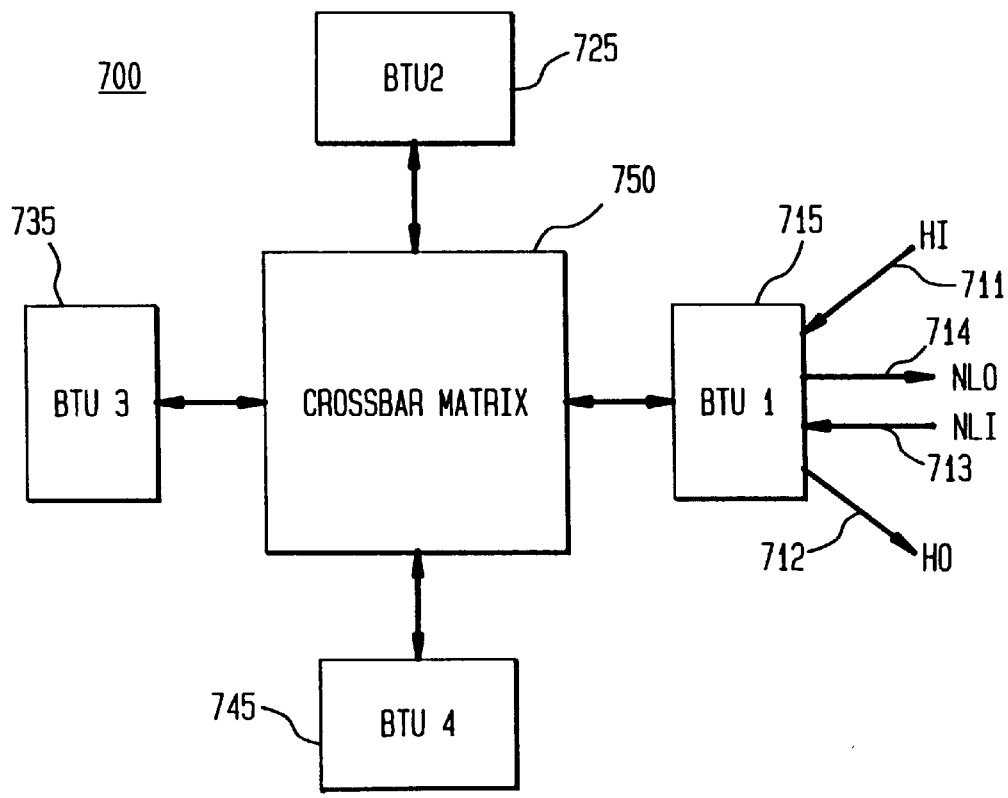
FIG. 24 is a high level block diagram of the distribution element.

The distribution element is the interconnection of four ports through the crossbar matrix. A high level block diagram of distribution element 700 commensurate with FIG. 7 is shown in FIG. 24 Crossbar matrix 750 provides full duplex parallel communication between BTUs 715, 725, 735, and 745 with the multicast addressing and the ability to provide four non-conflicting connections at the time. Crossbar matrix 750 is responsible for execution of L0 level functions, and each BTU is responsible for executing L1 level instructions.

BTU

External Interface

Each BTU (say BTU 715 for discussion purposes) provides three full duplex interfaces: to the network link (reference numerals 713 and 714), to the local host (reference numerals 711 and 712), and to CM 750 for the connections to the other BTU ports of the same distribution element. Both incomplete and complete interfaces to the BTU will be interconnected in the network configurations. If the devices on all three interfaces are present, i.e., CM, local host, and link transceiver, then the BTU provides an interface to the local host, the remote network port across the link, and the crossbar matrix. If CM 750 is not needed, then a BTU connects a is host to the network. If the local host is missing, the BTU connects the network links with the distribution element for the connection to multiple local hosts simultaneously, and/or remote network ports through the high speed links. If a link transceiver is missing, the BTU connects the local host with the crossbar matrix for the connection to multiple local hosts simultaneously, and/or remote network ports through the high speed links.

CM 750 has output and input direction. The output direction has a 160 bits wide data bus, bo_dout(159:0), which enables transfer of a whole frame to CM 750 in one transfer cycle, and a set of control and status signals. The control signals manage data transfer from BTU to CM. Status signals are used by the L1 execution unit, which directs data from the BTU to CM, in the initialization, routing, and control flow process.

There are three sets of control signals on the CM output interface, each one dedicated to one neighboring port. The sets are numbered from 2 to 4, where set number two is for the interface to the left neighboring port, set number three for the interface to the port on the opposite side of the distribution element, and set number four is for the interface to the right neighboring port. Any combination of these three sets of control signals, as well as output local host interface and output link interface, can be active at the same time in the multicast transfer.

Each set of control signals includes one input ready signal, lx_ready, which denotes whether the crossbar latch towards a specific port is ready to accept switched data. The transfer cycle is started only if all the latches in the multicast set are ready to accept the data, and thus the need for these ready signals. This readiness condition for the start of a transfer cycle is included for deadlock avoidance at L1 level, what is explained later.

There are two groups of data transfer control signals in each set of CM output interface control signals, each one controlling the two-way handshake self-timed transfer protocol. One group is for the data frame transfers (lx_dreq, and lx_dack), and another group is for the data flow control frame transfers (lx_creq, and lx_cack). The two types of frames are differentiated since the later has higher priority.

The status signals at the CM output interface include blocking signals from neighboring ports and local hosts, and status signals from the neighboring ports. Blocking signals are used by the data flow control process for detection of blocked paths. Status signals are used during initialization and reconfiguration, so that a BTU can determine where to send a request for the control processor.

The CM input interface is comprised of 160 bits wide data bus, bi_din(159:0), three sets of the data transfer control signals, each one dedicated to a specific neighboring port of the distribution element, and port and host blocking output signals. Each set of control signals is partitioned in two groups, for the same reason as in the output CM interface. The blocking signals are passed to other ports of the distribution element towards their CM output interface.

The host interface also has independent input and output direction. The output interface consists of a 40 bits wide data bus, ho_dout(39:0), two groups of data transfer control signals for two types of instructions, and a blocking signal from the host, ho_block, used by the data flow control process. Host status signals, host_status(0:1), also belong to the output interface. These are used during the initialization so that the BTU can determine whether it has an active local control host and a send control processor request (cp_req) instruction to it. The input interface has the data bus, hi_din(39:0), and the data transfer control signals and the blocking signal with the same purpose as in the output interface. The host input interface also has blocking signals, one from every other distribution element's port and one from every other local host, and these are used by the host to determine what paths through the distribution element are blocked, so that it does not propagate data frames destined to these paths until they are unblocked.

The link interface is a parallel full duplex interface to a network link serial transceiver. It also has input and output direction. The data transfer protocol is also the self timed two-way handshake.

The Architecture of BTU

Figure 25:
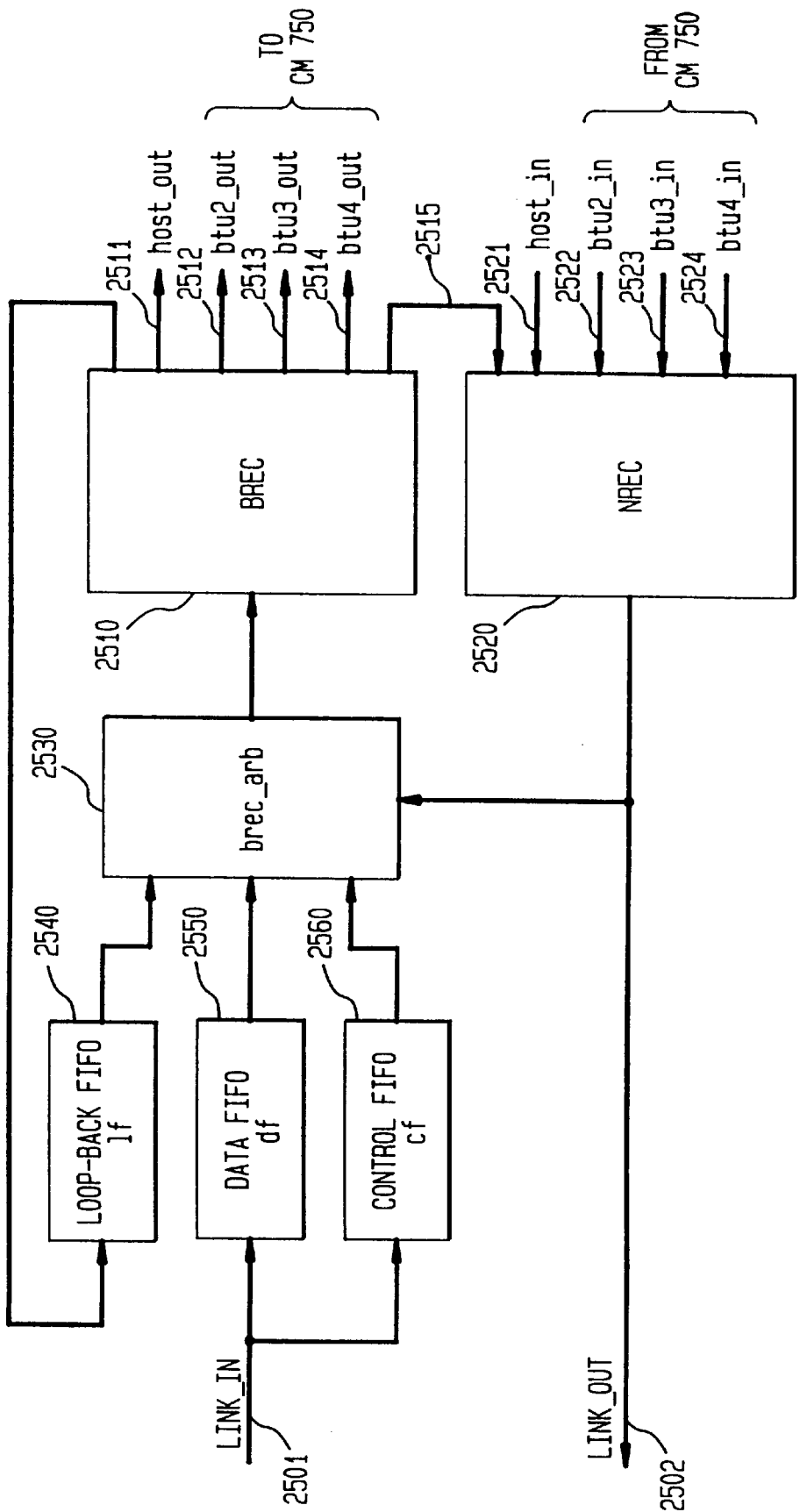
FIG. 25 is a high level block diagram of the bridge termination unit.

The high level block diagram of BTU 2500 is presented in FIG. 25. BTU 2500 can be partitioned, based on the direction of data flow, into input and output parts. The input part: receives data from the incoming link (link_in with reference numeral 2501) and transfers the incoming data to the local host (host_out with reference numeral 2511) and/or to CM 750 (btu2_out, btu3_out, btu4_out with reference numerals 2512, 2513, 2514, respectively); and the output part: receives data from the local host (host_in with reference numeral 2521) and/or CM 750 (btu2_in, btu3_in, btu4_in with reference numerals 2522, 2523, 2524, respectively) and transfers it to the output link (link_out with reference numeral 2502).

The input part is composed of three input buffers 2540, 2550, and 2550, BREC 2510 (the L1 level instruction execution unit), and BREC arbiter 2530, brec_arb, which arbitrates requests for the access to BREC 2510 from the three buffers and from the output part.

The output part is composed of NREC 2520 which arbitrates requests from other input ports and the local host for the output port of BTU 2500, and routes data to outgoing link 2502 or BREC 2510 via arbiter 2530.

The data from the three BTU external input interfaces (link, local host and CM) is directed in the following way. The data from link 2501 is always routed to BREC 2510, where the data can be directed to the local host (host_out) or the CM (btu2_out, btu3_out, and/or btu3_out) towards other BTU ports of the distribution element. The data from the local host interface (host_in) is received by NREC 2520, where the data is always routed to BREC 2510 via arbiter 2530. From BREC 2510, the data can be routed to the CM (btu2_out, btu3_out, btu4_out), or turned back to NREC 2520 via path 2515 in order to be sent to link 2502. The reason for routing all local host data through the BREC 2510 is to keep and process all state information pertaining to the VC in one execution unit (BREC) rather than duplicating the state in two places (BREC and NREC) and dealing with the consistency of separate copies. Data from the CM (btu2_in, btu3_in, btu4_in) is received by NREC 2520 and directed to the link output interface 2502 or BREC 2510 via arbiter 2530, where it can be sent to the local host (host_out) or turned back to NREC 2510. The reason for looping path (NREC-BREC-NREC) is again to keep the state information of VC private in one controller.

One example of this loop path is a snap instruction, which is merged in the backward propagate direction. The snap instruction is routed from NREC 2520 to BREC 2510, where the BREC decides if it has received the snap from all the guards, and if it has, routes the snap back to NREC 2520, and if it has not, changes the snap to the end_bp instruction or discards it, depending on the frame number.

The data path from NREC to BREC is also used for transfer of data flow control (VC blocking and unblocking) frames originated by other ports of the distribution element.

The function of each BTU building block from FIG. 25 is described next.

BREC

A Bridge RECeiver (BREC) is the main control block of a BTU, responsible for L1 level instruction execution. A BREC performs all the functions specified by the L1 instruction set. These are: routing, data flow control, logical clock synchronization and sequencing, backward propagate merging of instructions and control fields, forward propagate selective transfer and multicast of control fields, initialization and re-initialization, and L2 and L0 level interface. The semantics of these functions was explained in the instruction set and VC state description in the Architecture section. A BREC also performs local name (VC number) translation for all the frames that are coming from the link interface.

The sources of data for a BREC are the three input buffers and the corresponding NREC of the encompassing BTU. Each instruction's execution by the BREC can produce one output instruction, which is possibly multicasted, two output instructions or no output instructions at all, depending on the instruction and the state of the VC and the ports of the distribution element.

Most instructions belong to the first class, i.e., one input instruction produces one output instruction. There is no instruction whose semantics specify two instructions as the output, but the second output instruction can be the side effect of any instruction that produces one instruction as the output.

The second instruction as a side effect occurs when execution of a data frame instruction encounters a change in the blocking status of the data path. If the path is blocked prior to the execution of the data frame instruction, a control flow blocking instruction is sent to the previous node on the path before the data frame instruction execution is completed. On the other hand, if the path is unblocked prior to the execution of the data frame instruction, and the data frame instruction is the last one coming from the loop-back buffer from the previously blocked path, a control flow unblocking instruction is sent to the previous node on the path before the data frame instruction execution is completed.

Some data frame and control flow instructions only change the VC and/or port status information, thus producing no instruction at the output. An example of this kind of data frame instruction is cwrite, which writes information into the VC status, port status and translation memory. The example of a data flow control instruction that produces no output instruction is the blockbp instruction, sent from a guard to the captain port of the distribution element. That instruction will only change the blocked_bp field in the VC status.

The instruction outputted by a BREC can be directed to the loop-back buffer if the propagation path is blocked or the data frame sequence number is not the next one to be propagated, or it can be directed to any set of output ports (including the one from its own BTU) and the local host output port.

NREC

A Node RECeiver (NREC) block controls the output part of a BTU, i.e., it generates data for the network link and receives data from other ports of the distribution element and the local host attached to its BTU. There are five sources of data for a NREC: the BREC of its associated BTU, three other BTU ports, and the input port of the local host. Each request can belong to one of the two priority classes: higher priority data flow control frames and lower priority data transfer frames. The two priority classes are differentiated by separate data transfer control signals. The requests within each priority class are arbitrated by the fair arbitration scheme described earlier. Any request from a high priority class has higher priority than a request from low priority class.

There are two reaons for granting higher priority to the data flow control frames. First, the sooner they are processed the fewer frames will be propagated to the blocked path and make resources (links and nodes) of that path available for the data that can be propagated towards destinations. Second, data flow control frames are short, only 11 bits in the current implementation, and they are processed fast, so that their execution does not impose significant delay in processing of data frames.

Every input frame to a NREC results in one output frame, except a cwrite instruction destined to it that does not produce any output frame. The output frame can be routed to the output link interface or the BREC of its encompassing BTU. This routing function is local to its BTU and the local host attached to it. It is based on the opcode of the instruction executed, place of the BTU on the spanning tree license field of the VC state) belonging to its distribution element, and tuning of the local host in the particular VC.

The NREC performs local name translation for all frames coming from other ports of other distribution elements. Local names within the frames coming from its own BREC or local host are not translated, since these three entities share the same local name space.

FIFO Buffers

The three FIFO buffers 2540, 2550, and 2560 at the input path to BREC 2510 are used to compensate in delay for processing data frames and blocking requests, as well as to store frames on the blocked path which alrady arrived at the node. There are two FIFOs 2550 and 2560 for data frame instructions, df and lf, and one FIFO 2540 for data flow control frame instructions, cf.

Data frame FIFO df is used to store incoming data frames from link 2501. It compensates for the difference between input link data rate and availability of the bandwidth at the output ports. The accumulation of the data frames in this buffer is an indication that some output path of the distribution element is congested, and that input data flow into the buffer should be stopped in order to avoid losses. Thus, when the dfFIFO is half full, the block_port data flow control instruction is sent to the BTU on the other end of the link, in order to block its output port.

Data frame loop-back FIFO, lf, is used for storing the frames that cannot be propagated since the BREC registered that their path is blocked. The frames from this FIFO are constantly fed back to the BREC, when there are no new incoming frames to be processed, so that they can be propagated towards the destination if, in the meantime, their path becomes unblocked. It has to be of the same size as the input data FIFO, df, since all frames from df may end up in loop-back FIFO, if they encounter blocking path.

Data flow control frame instructions FIFO, cf, is used to buffer short frames that are coming rarely. These frames are buffered separately from data frames so that the later ones would not delay execution of blocking instructions, when many data frames are waiting in the df FIFO for access to the BREC. Frames from the cf FIFO have highest priority on the path towards the BREC. This is a shallow FIFO, since it is used for rare signaling instructions that are processed at the highest priority.

There are two types of FIFO buffers at each BTU: data FIFO and control FIFO. Data FIFO has higher output data rate, in order to reduce time for the transfer of 160 bits data frame into the brec_arb and the BREC itself. The higher output data rate is achieved by making the output data bus of data FIFO 160 bits wide, whereas data bus of control FIFO is 40 bits wide.

There are two instances of data FIFOs, namely, df for the interface to external input link and lf for the loop-back data path. These FIFOs are identical in the size and function. A data FIFO is comprised of 40 bits wide FIFO memory, 160 bit wide output latch and control block, data_fifo_cntrl. The width of the FIFO and output latch is accommodated to match required input and output data rates. A control block manages writing into the FIFO buffer, reading from the FIFO buffer, writing into the latches and data transfer to the next pipeline stage.

The control FIFO has a similar structure, except that there is no output latch, since the width of the input and the output data path is the same, i.e., 40 bits.

BREC Arbiter

This block arbitrates requests for the BREC. Five different requests are differentiated: data flow control frames coming from the NREC and the external link, and data frames coming from the external link, the NREC and the loop-back buffer. The priorities of the requests are in the same order as listed above, with the control frames having highest priority, and the data frames from the loop-back buffer having the lowest priority.

Frame Latches and Deadlock Avoidance

The previous presentation of the high-level design has shown that a data path through the distribution element is complex and parts of the path are shared by multiple sources. The competing data paths sections are arbitrated separately because of the distributed design that enforces concurrence. The possible overlap of required paths through the distribution element raises the possibility of deadlock, if at least two data frames hold two different portions of the data path, and each one requires the other one to free data path it holds in order to free a data path held by itself. Two possible deadlock scenarios and the solution for the deadlock avoidance are presented next.

The first deadlock scenario can occur due to the possible dependency of data paths of frames within BREC and NREC blocks of the same BTU. If a stream of data frames goes from BREC to NREC of the same BTU, and a stream of data frames goes from NREC to BREC, at some point the data frame at BREC will wait for NREC to become free in order to propagate towards it, and NREC will wait for BREC to become free so that it can accept pending data frame from NREC.

The solution to this deadlock problem is based on decoupling of BREC-NREC-BREC loop path by additional frame latch and arbitration scheme at NREC input which guarantees deadlock avoidance. The additional frame latch is placed in brec_arb block, and it latches the frame that is coming from NREC. All input requests to the NREC, except requests from its own BREC, are arbitrated by NREC only if this additional latch at brec_arb is ready to accept data, i.e., when it is sure that data accepted by NREC can propagate out of it. The data request from BREC is arbitrated and accepted by NREC even if the frame latch at the brec_arb is not free, because it does not require path from NREC back to BREC, but rather a path from NREC to the external link, which can not be blocked for the frame that is already in NREC. Thus, this guarantees that the frame waiting in the BREC to be accepted by NREC will be propagated in the worst case after five transfer cycles of NREC, and the above deadlock scenario is avoided.

The second deadlock scenario can occur due to the possible dependency of data paths of frames within different BTUs. The frames processed by one BREC can be directed to the BREC of some other BTU. If this kind of data traffic is reciprocal between at least 2 BTUs, it can lead to deadlock. For example if BREC from BTU1 is sending data stream to BREC of BTU2, and BREC from BTU2 is sending data stream to BREC of BTU1, at some point both BRECs will wait for each other to become free in order to continue, which is a deadlock situation.

The key to the solution for avoidance of this kind of deadlock are the following two facts about the routing paths: (a) the frames coming to the BREC from the BREC of some other BTU of the distribution element can only be routed to its local host or its NREC, and both of these paths will always be accessible to the BREC in the bounded worst case time; and (b) the frames routed from BREC to other BRECs of the distribution element can originate from the external input network link or its local host, but not from the other BTU of the distribution element. These two facts are not restrictions imposed on data paths in order to avoid deadlock, but rather the consequence of the directed spanning tree routing policy. The solution to the deadlock imposes restriction to the frames that can be directed to other BREC of the distribution element, i.e., those coming from input link or local host, so that they can be accepted by the BREC only if they will not block execution of eventual subsequent frames that can arrive from other BRECs of the distribution element. This is achieved by placing two frame latches at the output of the BREC, but before the CM. The data frame that can be sent to other BRECs of the distribution element is accepted by brec_arb only if both of these latches are ready to accept data, but the data frames coming from other BRECs are accepted even if only one of this frame latches is ready to accept data. The data from these latches can be sent towards the CM in the different order it was written into, if the addressed set of cross-point latches in the CM is not ready for one pending frame, while it is ready for the other. This guarantees that the frames coming from other BRECs of the distribution element will not be blocked by the BREC that has to send data to them, and the above deadlock scenario is avoided.

Crossbar Matrix

Figure 26:
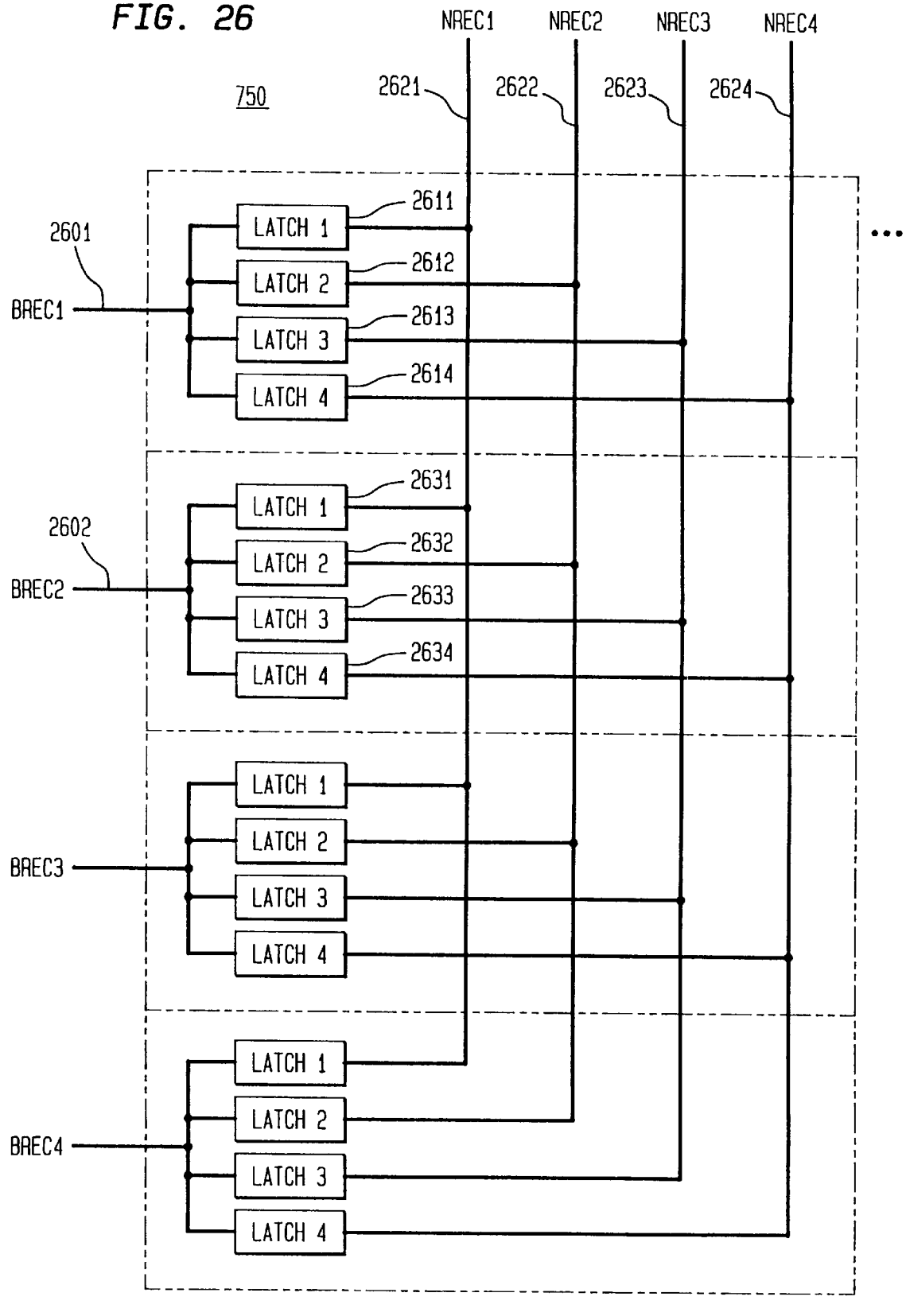
FIG. 26 is a block diagram of the crossbar matrix depicting the one-frame latches.

The crossbar matrix has four frame latches per each input port, as depicted in FIG. 26. For example, latches 2611–2614 buffer the BREC 2601 from NRECs 2621–2624. Similarly, latches 2631–2634 buffer BREC 2602 from NRECs 2621–2624. Each latch stores one incoming frame; each latch has an embedded controller which manages writing into the latch, generating requests to the destination NRECs, and reading from the latch. This module provides connection between the BTUs of the distribution element. Thus, the crossbar matrix has four ports, each one dedicated to one BTU. Every port has an input interface, which receives data from BTU, and an output interface that sends data to BTU. The input interface is identical to BTU's output interface of the CM port, and similarly is the output interface identical to the input interface of BTU's CM port. The purpose and the function of these signals were explained earlier.

The input interface of the CM port can access up to four frame latches in a multicast fashion, each one dedicated to one neighboring BTU of the distribution element as well as its own BTU. Each latch is an active entity, which de-couples its input from the output. The active latches at the cross-points are used in order to avoid deadlock due to the competing requests from multiple BRECs for overlapping sets of NRECs in a multicast transfer, where overlapping set has more than one unit. This deadlock problem and the solution were discussed earlier.

Each latch has the ready output signal that indicates if it is ready to receive a frame or not. It is necessary for the implementation of the procedure for avoidance of deadlock between BRECs of the distribution element due to the reciprocal traffic requests. The transfer cycle from a BTU to the addressed set of latches is not started unless all addressed latches are ready. This is because there can be two pending frames in BREC, in the frame latches within BREC used to facilitate deadlock avoidance, and if all destination latches are not ready for one pending request, the other pending request should be granted if it can go through, which would not be possible if the first one already started the transfer cycle.

Although various embodiments which incorporate the teachings of the present invention have been shown and described in detail herein, those skilled in the art can readily devise many other varied embodiments that still incorporate these teachings.

We claim:

1. A method for reconfiguring a spanning tree covering a network of distribution elements interconnected to each other with links, the spanning tree including a current root distribution element and leaf distribution elements, the method comprising the steps of back-propagating a reorientation request from one of the leaf distribution elements to the current root distribution element wherein said one of the leaf distribution elements requests root status for a next cycle, if the current root distribution element relinquishes its root status, forward-propagating a reorientation response from the current root distribution element to the leaf distribution elements wherein the reorientation response identifies said one of the leaf distribution elements as the next root distribution element for the next cycle, and reorienting the spanning tree for the next cycle so that said one of the leaf distribution elements becomes the next root distribution element, and each of the other leaf distribution elements as well as the current root distribution element each becomes a spanning tree element, wherein each of the distribution elements executes synchronization instructions selected from the following set of synchronization instructions: a snap instruction to indicate that an issuing one of the distribution elements has completed a transmission of a data frame, including the reorientation request; a discharge instruction to indicate that an issuing one of the distribution elements has propagated a received data frame, including the reorientation response; and a charge instruction to indicate that an issuing one of the distribution elements has completed a write-read-reorientation cycle, the order of execution of the instructions being snap, discharge, and charge, wherein the step of back-propagating includes the step of back-propagating the reorientation request from said one of the leaf distribution elements to the current root distribution element with the snap instruction wherein said one of the leaf distribution elements requests root status for the next cycle, wherein the step of forward-propagating includes the step of forward-propagating the reorientation response from the current root distribution with the discharge instruction to all leaf distribution elements wherein the reorientation response identifies said one of the leaf distribution elements as the next root distribution element during the next cycle, and wherein the step of reorienting includes the step of reorienting the spanning tree for the next cycle so that said one of the leaf distribution elements becomes the next root distribution element and each of the other leaf distribution elements as well as the current root distribution element each becomes a spanning tree element.

2. A method for reconfiguring a spanning tree covering a network of distribution elements interconnected to each other with links, the spanning tree including a current root distribution element and leaf distribution elements, and wherein each of the distribution elements interconnects an associated host and incoming and outgoing ones of the links and includes:

a crossbar matrix, a termination unit, coupled to the host, the links, and said crossbar matrix, said termination unit including a node receiver for receiving incoming host data from the host, for receiving incoming data from said crossbar matrix, and for transmitting outgoing link data to the outgoing link, and a bridge receiver for receiving incoming link data from the incoming link, for transmitting outgoing host data to the host, for transmitting node data to said node receiver, and for transmitting outgoing data to said crossbar matrix, said node receiver further arranged for receiving said node data from said bridge receiver, said node receiver further arranged for transmitting bridge data to said bridge receiver and said bridge receiver further arranged for receiving said bridge data, the method comprising the steps of back-propagating a reorientation request from one of the leaf distribution elements to the current root distribution element wherein said one of the leaf distribution elements requests root status for a next cycle, if the current root distribution element relinquishes its root status, forward-propagating a reorientation response from the current root distribution element to the leaf distribution elements wherein the reorientation response identifies said one of the leaf distribution elements as the next root distribution element for the next cycle, and reorienting the spanning tree for the next cycle so that said one of the leaf distribution elements becomes the next root distribution element, and each of the other leaf distribution elements as well as the current root distribution element each becomes a spanning tree element.

3. The method as recited in claim 2 wherein each of the distribution elements transitions in synchronized cycles between a write phase, a read phase, and a reorientation phase in each cycle, wherein said reorientation request is back-propagated during the write phase, and wherein said reorientation response is forward-propagated during the read phase.

4. The method as recited in claim 2 wherein each of the distribution elements executes synchronization instructions selected from the following set of synchronization instructions: a snap instruction to indicate that an issuing one of the distribution elements has completed a transmission of a data frame, including the reorientation request; a discharge instruction to indicate that an issuing one of the distribution elements has propagated a received data frame, including the reorientation response; and a charge instruction to indicate that an issuing one of the distribution elements has completed a write-read-reorientation cycle, the order of execution of the instructions being snap, discharge, and charge, wherein the step of back-propagating includes the step of back-propagating the reorientation request from said one of the leaf distribution elements to the current root distribution element with the snap instruction wherein said one of the leaf distribution elements requests root status for the next cycle, wherein the step of forward-propagating includes the step of forward-propagating the reorientation response from the current root distribution with the discharge instruction to all leaf distribution elements wherein the reorientation response identifies said one of the leaf distribution elements as the next root distribution element during the next cycle, and wherein the step of reorienting includes the step of reorienting the spanning tree for the next cycle so that said one of the leaf distribution elements becomes the next root distribution element and each of the other leaf distribution elements as well as the current root distribution element each becomes a spanning tree element.

5. The method as recited in claim 2 wherein the spanning tree includes internal distribution elements, and wherein said step of reorienting includes the step of reorienting the spanning tree for the next cycle so that said one of the leaf distribution elements becomes the next root distribution element, and each of the other leaf distribution elements each remains a leaf distribution element and the current root distribution element becomes either an internal element or a leaf distribution element depending the connectivity of the links to the current root distribution element.

* * * * *